United States Patent [19]
Tanaka et al.

[11] Patent Number: 5,577,873
[45] Date of Patent: Nov. 26, 1996

[54] METHOD AND APPARATUS FOR STOWING A LOAD

[75] Inventors: Nobuhiro Tanaka; Eiji Hirata, both of Saitama, Japan

[73] Assignee: Kao Corporation, Tokyo, Japan

[21] Appl. No.: 346,072

[22] Filed: Nov. 29, 1994

[30] Foreign Application Priority Data

Nov. 30, 1993 [JP] Japan ................................. 5-323402
Sep. 29, 1994 [JP] Japan ................................. 6-259006

[51] Int. Cl.⁶ ............................................. B65G 67/04
[52] U.S. Cl. ........................ 414/400; 414/786; 414/280; 414/661; 414/664
[58] Field of Search ................................ 254/93 R, 400, 254/395, 390, 280, 663, 340, 343, 681, 345, 662, 661, 659, 786, 790.3, 793.4, 794.3, 664

[56] References Cited

U.S. PATENT DOCUMENTS

| | | |
|---|---|---|
| 2,574,045 | 11/1951 | Lapham .............................. 414/664 X |
| 3,710,961 | 1/1973 | Bornstein . | 
| 3,780,893 | 12/1973 | Lassig et al. ...................... 414/400 X |
| 4,171,178 | 10/1979 | Birkenfeld . |
| 4,415,302 | 11/1983 | Brouwer et al. ................... 414/661 X |
| 4,938,652 | 7/1990 | Sanderson ........................... 414/664 X |
| 4,995,785 | 2/1991 | Platteschorre ...................... 414/661 X |

FOREIGN PATENT DOCUMENTS

| | | |
|---|---|---|
| 220547 | 3/1962 | Australia . |
| 2808922 | 9/1979 | Germany . |
| 4140452 | 6/1992 | Germany . |
| 4226870 | 2/1993 | Germany . |
| 13271 | 2/1977 | Japan .................................... 414/400 |
| 966227 | 8/1964 | United Kingdom .................. 414/661 |

OTHER PUBLICATIONS

"Annual Catalogue Guidebook of Materials Handling Equipment"0 Dated: Dec. 20, 1987.
"Automated Production and Material Handling" Dated: Oct. 1, 1994.

Primary Examiner—Frank E. Werner
Attorney, Agent, or Firm—Dvorak and Traub

[57] ABSTRACT

In a method for stowing a load 1 in a load stacking position on a rear deck 4A, the load 1 is mounted on a slide plate 63 and is pushed by a pusher 51 to a push-in position until the load 1 and the slide plate 63 reach a load stacking position which is close to and facing against a front wall 4B on the rear deck 4A. Then the load 1 is transferred to the load stacking position by pulling the slide plate 63 back from the load stacking position with the pusher 51 kept in the push-in position.

3 Claims, 17 Drawing Sheets

F I G. 14A
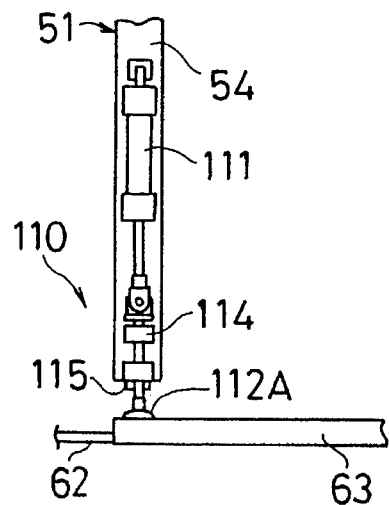
F I G. 14B
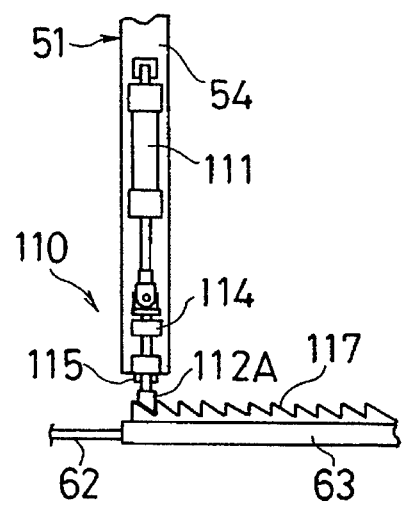
F I G. 14C
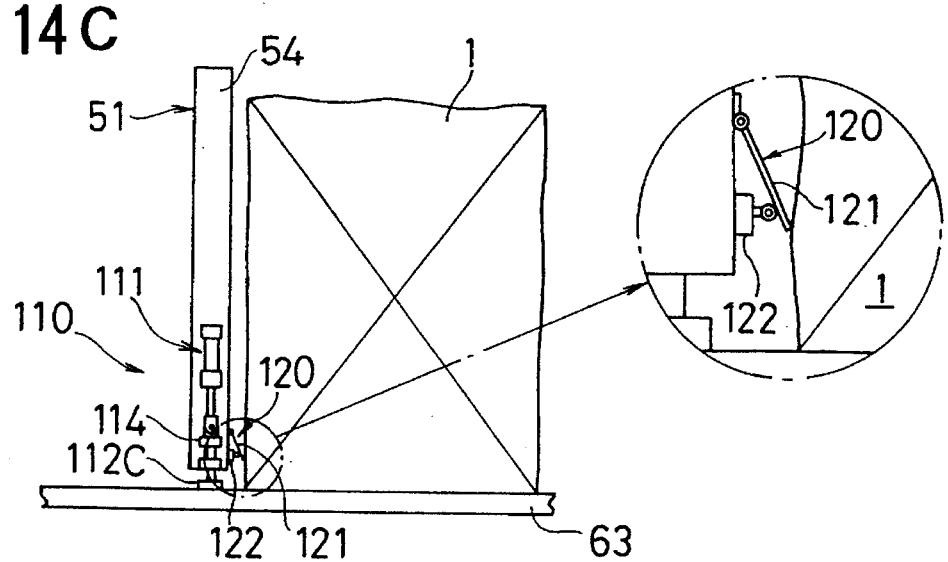

METHOD AND APPARATUS FOR STOWING A LOAD

BACKGROUND OF THE INVENTION

1. Field of the Invention

The present invention relates to a method and apparatus for stowing a palletized load and other loads stacked in tiers on the rear deck of a truck.

2. Description of the Background Art

The prior art will be discussed in detail in connection with the drawings later.

SUMMARY OF THE INVENTION

Accordingly, it is an object of the present invention to enable a load to be stowed in a loading position on the rear deck without causing collapse of the load.

It is another object of the present invention to enable a load to be stowed in an appropriate position close to the front wall at the back of the rear deck in a stable manner.

It is still another object of the present invention to reduce the required working space for loading.

According to the present invention, the following functions are accomplished:

(1) The pusher stows a load and the slide plate in the loading position near and facing against the front wall of the rear deck (the wall surface of the rear deck or the wall of a preceding load which has already been stowed), and then only the slide plate is pulled out while the pusher is kept in the same position, thus stowing the load. Hence, even if the load topples when the slide plate is pulled out, the load is supported by the front wall on the rear deck and it does not collapse.

(2) The pusher moves the load and the slide plate to the position close to and facing against the front wall on the rear deck. The load is then securely stowed in an appropriate position near the front wall on the back of the rear deck. This prevents the load from being pushed too far forward to cause crushing and it also prevents insufficient forward pushing to leave an insufficient loading space on the rear deck for the subsequent load.

(3) The load to be placed on the slide plate is moved to the rear deck side of the slide plate first. In this way, the load is pushed in by the pusher to set the load in the load stacking position close to and facing against the front wall on the rear deck. The load is then set in the aforesaid load stacking position together with the slide plate rather than being slid onto the rear deck from the middle point of the slide plate. Hence, tumbling or collapse of the load, which may occur if the load is to slide on the slide plate, can be avoided in the stage before the load is settled in the load stacking position.

Furthermore, the load can be accurately moved to the load stacking position at the back of the rear deck by moving the load to the leading edge of the slide plate and stacking it there, moving the slide plate to an initial position (away from the back of the rear deck by the length of the load), and simply giving the load a certain amount of push by the pusher. This prevents the load from being crushed from too much pushing or being insufficiently pushed in, leaving an insufficient loading space for the next load, or other similar problem.

(4) The load carriage constituting the loading apparatus has a base plate and a slide plate. Accordingly, the load and the slide plate are pushed by the pusher until they reach the load stacking position near and facing against the front wall on the rear deck, and the slide plate is pulled back with the pusher kept in the same position. Thus, the loading apparatus can be used to implement functions (1) through (3).

(5) The slide plate can be equipped with wheels which make the frictional force generated between the slide plate and the rear deck smaller than the frictional force generated between the slide plate and the load when the load is pushed by the pusher. This makes it possible to securely move the slide plate and the load together on the rear deck.

(6) The pusher stows a load and the slide plate in the loading position near and facing against the front wall of the rear deck (the wall surface of the rear deck or the wall of a preceding load which has already been stowed). Then only the slide plate is pulled out while the pusher is kept in the same position, thus stowing the load. Hence, even if the load tumbles when the slide plate is pulled out, the load is supported by the front wall on the rear deck and it does not collapse.

(7) The pusher moves the load and the slide plate to the position close to and facing against the front wall on the rear deck. The load can thereby be securely stowed in an appropriate position near the front wall on the back of the rear deck. This prevents the load from being pushed too far forward which would cause crushing; it also prevents insufficient forward pushing, leaving an insufficient loading space on the rear deck for the subsequent load.

There are advantages in pushing the slide plate forward by coupling the pusher to the slide plate when stowing a load by the pusher:

(a) When the pusher directly pushes a load forward, if the load is light in weight, then low frictional drag is produced between the load and the slide plate; therefore, when the pusher pushes the load, only the load is pushed out with the slide plate remaining stationary, causing the load to collapse on occasion.

Even when rolling contact is provided between the slide plate and the rear deck, because the slide plate itself is heavy, weighing 250 kg, for example, if the load weighs about 8 kg, then;

$$(250+8 \text{ kg}) \times 0.01 = 2.5 \text{ kg} > 8 \text{ kg} \times 0.3 = 2.4 \text{ kg}$$

provided the coefficient of the rolling friction generated between the slide plate and the rear deck is 0.01 and the coefficient of sliding friction generated between the load and the slide plate is 0.3. Thus, the frictional drag between the load and the slide plate is reduced. This also applies to a light or small load.

The same situation exists even in the case of a heavy load, if a chain for pulling the slide plate back is connected to the slide plate and the slide plate pulls the chain out at the time of pushing a load forward, because the pull-out drag of the chain acts as a force to block the slide plate.

(b) To solve the problem described in (a), according to the present invention, the pusher is coupled to the slide plate to securely push the slide plate forward to prevent a load from being pushed out with the slide plate stationary, resulting in the collapse of the load especially when the load is light. This means that the pusher is capable of positioning the load on the slide plate in the loading position in a secure and stable manner by securely pushing the slide plate forward.

(8) The load to be placed on the slide plate is moved to the rear deck side of the slide plate first and the pusher is coupled to the slide plate, and then the slide plate is pushed forward. In this way, the slide plate is pushed forward by the pusher to set the load in the loading position close to and facing against the front wall on the rear deck. The load is then set in the aforesaid loading position together with the slide plate rather than being slid onto the rear deck from the middle point of the slide plate. Hence, tumbling or collapse of the load, which may occur if the load is to slide on the slide plate, can be avoided in the stage before the load is settled in the loading position.

Furthermore, the load can be accurately moved to the loading position at the back of the rear deck by moving the load to the leading edge of the slide plate and stacking it there, moving the slide plate to an initial position (away from the back of the rear deck by the length of the load), and simply giving the slide plate a certain amount of push by the pusher. This prevents the load from being crushed from excessive pushing or being insufficiently pushed forward, leaving an insufficient loading space for the next load.

(9) The load carriage constituting the loading apparatus has a base plate and a slide plate, the slide plate being connectable to the pusher. After the pusher is coupled to the slide plate, the load and the slide plate are pushed forward until they reach the loading position near and facing against the front wall on the rear deck by the pusher. The slide plate can be pulled back with the pusher kept in the same position by disconnecting the pusher from the slide plate.

BRIEF DESCRIPTION OF THE DRAWINGS

The present invention will more fully understood from the detailed description given below and from the accompanying drawings which should not be taken to be a limitation on the invention, but for explanation and understanding only.

FIGS. 14A to 14C are schematic diagrams showing a modified example of the coupling device;

DESCRIPTION OF THE BACKGROUND ART

Figure 10:
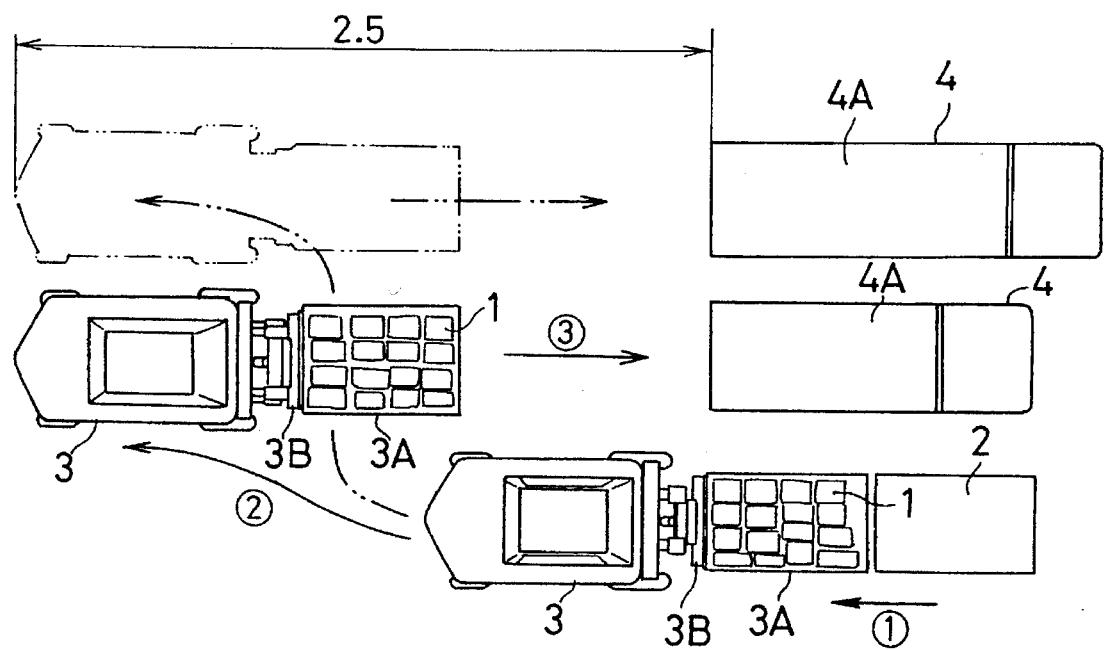
FIG. 10 is a schematic diagram showing an example of the conventional working space for loading.

FIG. 10 shows a schematic diagram showing a conventional loading method. In this prior art, load I is moved from a pallet 2 to a forklift 3 and stowed onto a rear deck 4A of a truck 4 by the forklift 3.

Figure 11A:
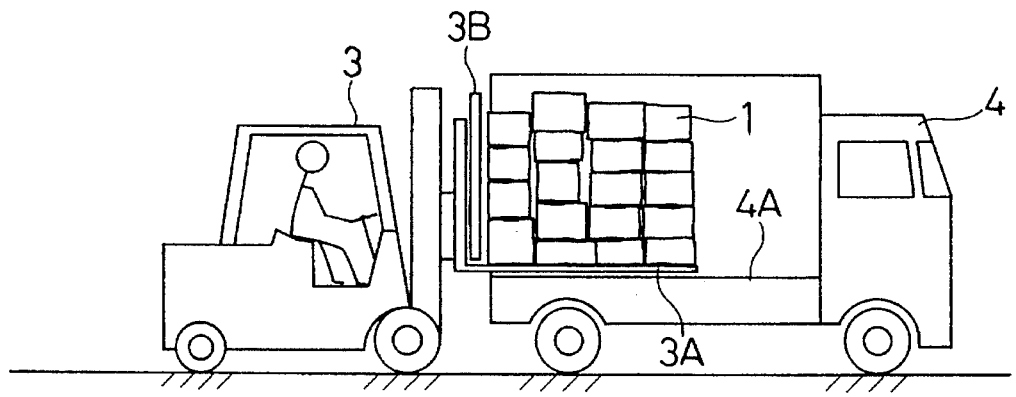
FIGS. 11A to 11C are schematic diagrams showing an example of the conventional loading method.

FIG. 11 shows a state wherein the load 1 is pushed on to the rear deck 4A by the push-pull forklift 3 until it reaches the back thereof. A fork 3A of the forklift 3 is placed onto the rear deck 4A, then the load 1 on the fork 3A is pushed into the back of the rear deck 4A by a pusher 3B.

The prior art, however, poses the following problems.

Figure 11B:
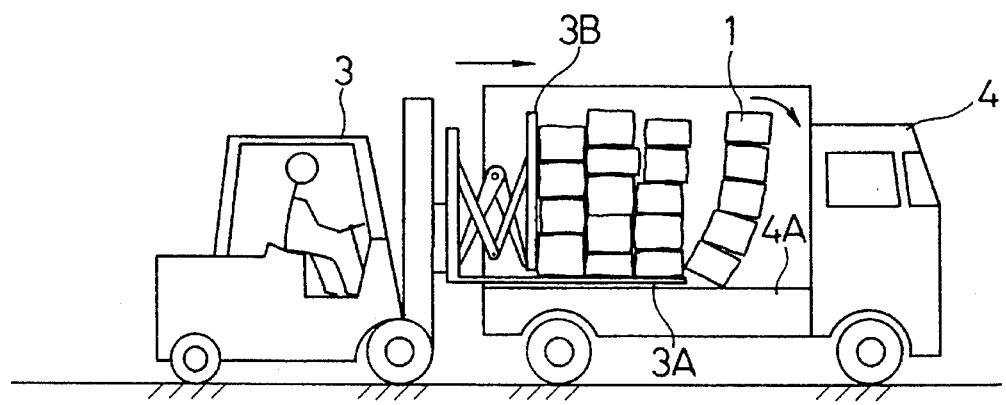

There is a long distance between the fork 3A and the back wall of the rear deck 4A and therefore, if the load is caught in the stepped section between the fork 3A and the rear deck 4A while the load 1 on the fork 3A is being pushed out by the pusher 3B, the load 1 is collapsed because there is nothing to support the load 1 (FIG. 11B). Further, the load 1 is slid and moved by the pusher 3B, therefore, the load 1 tends to trip from the friction generated between itself and the rear deck 4A, and if slight unbalance takes place in the load 1, it easily falls from being pushed by the following load 1.

Figure 11C:
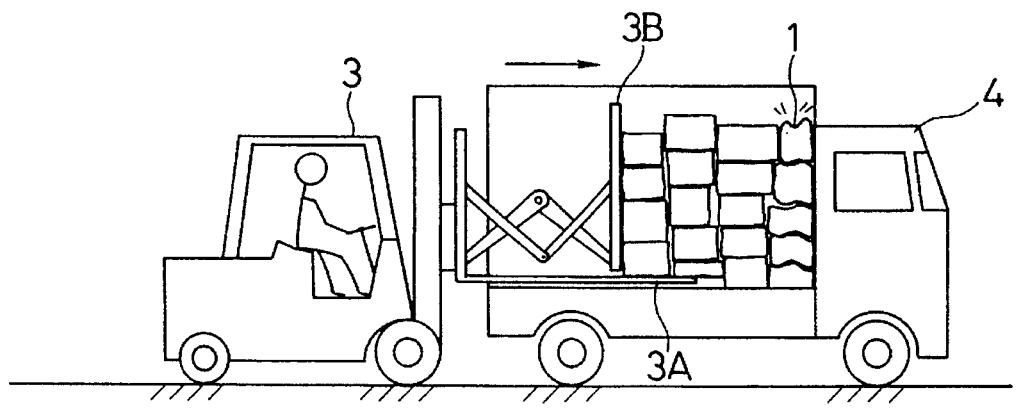

When pushing the load 1 onto the rear deck 4A by the pusher 3B, the load 1 or the pusher 3B blocks the operator's view, preventing the operator from looking at the back of the rear deck 4A and from checking whether the load 1 has fully been pushed to the back of the rear deck 4A. As a result, the operator may push the load 1 too much and crush it or fail to push it insufficiently, leaving an insufficient space on the rear deck for stowing in the next load (FIG. 11C).

A large working space is required for the forklift 3 to turn.

DESCRIPTION OF THE PREFERRED EMBODIMENTS

First Embodiment (FIG. 1 through FIG. 9)

Figure 1A:
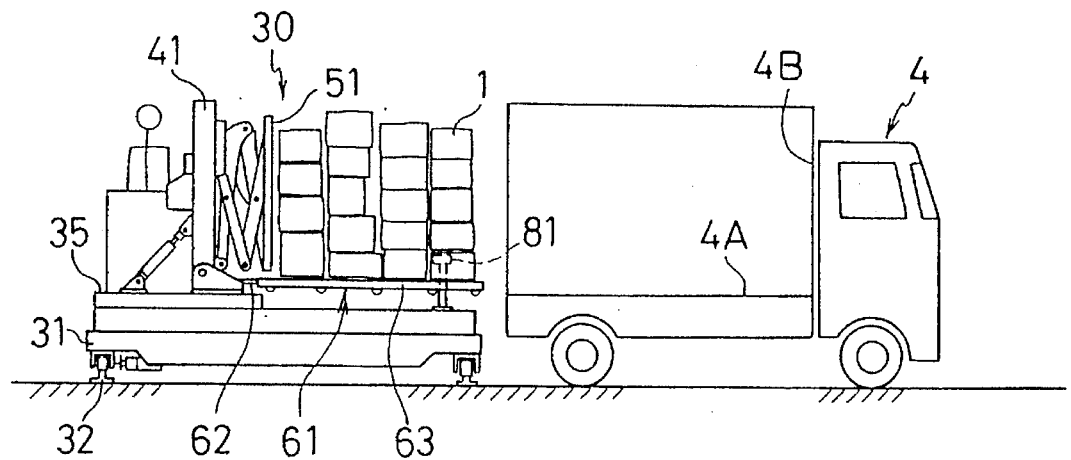
FIGS. 1A and 1B are a schematic diagrams showing shipping equipment.
Figure 1B:
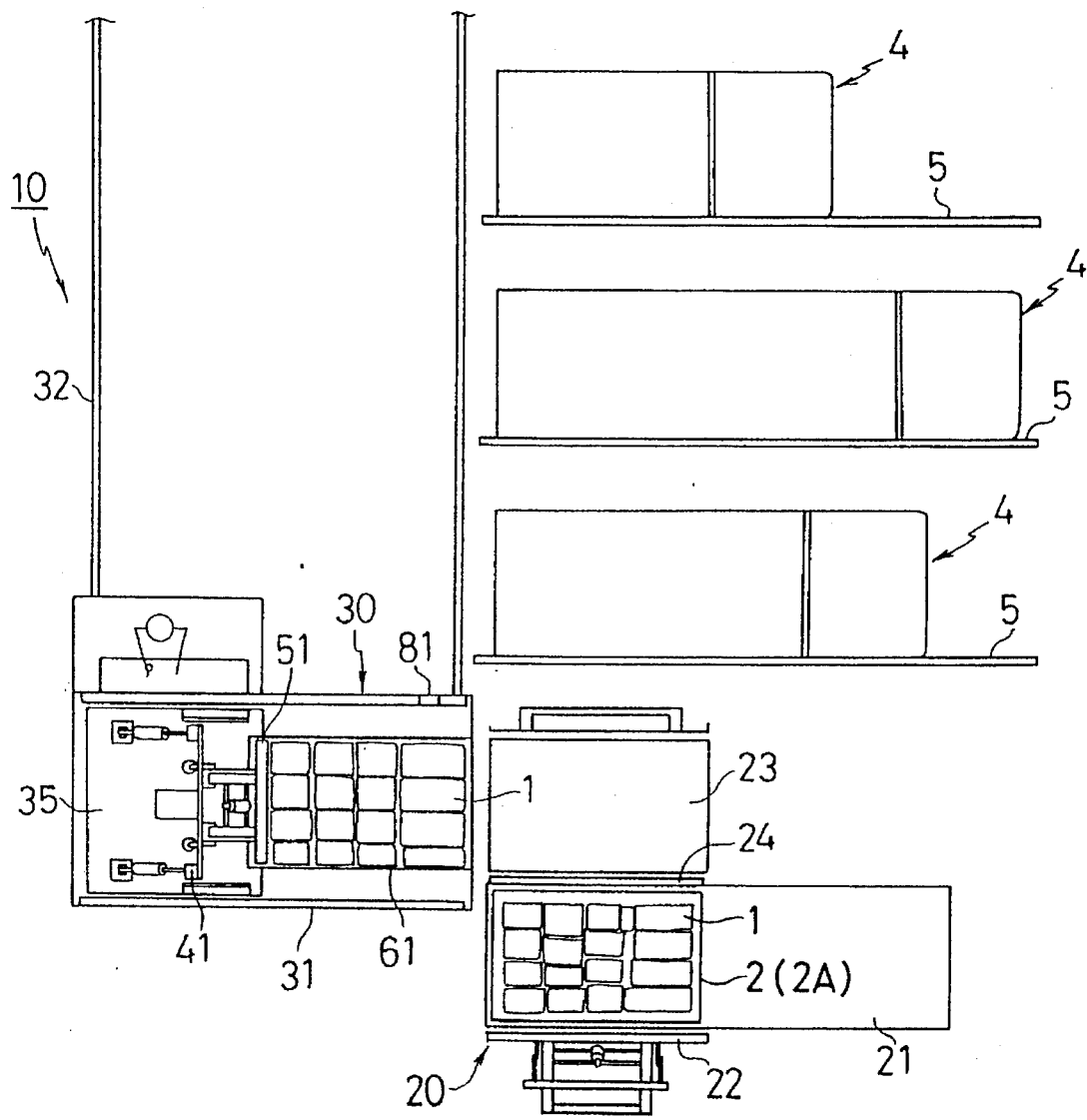

(A) Shipping equipment (FIG. 1)

Shipping equipment 10 is constituted by a load transferring apparatus 20 for transferring the load 1 from the pallet 2 and a loading apparatus 30 for stowing the load 1 onto the rear deck 4A of the truck 4.

The truck 4 is positioned with respect to loading apparatus 30.

The load transferring apparatus 20 receives the palletized load 1 supplied by the forklift 3, and then it transfers only the load 1 to the loading apparatus 30.

The loading apparatus 30 receives the load 1 from the load transferring apparatus 20, and carries the load 1 to the truck 4 to be loaded, and stows the load 1 on to the rear deck 4A of the truck 4.

(B) Load 1 (FIG. 1)

The style of package of the palletized load is such that a slip sheet (resinous sheet) 2A is laid on the pallet 2 and the load 1 forward of carton boxes, plastic containers, etc. is stacked on the slip sheet 2A.

The size of the pallet 2 is approximately 2.2 m. There are two different styles of package of the palletized load as shown below:

1. Load stacked for 2.2 m (Large package)
2. Load stacked only for 1.1 m, half of above (Small package)

Figure 9:
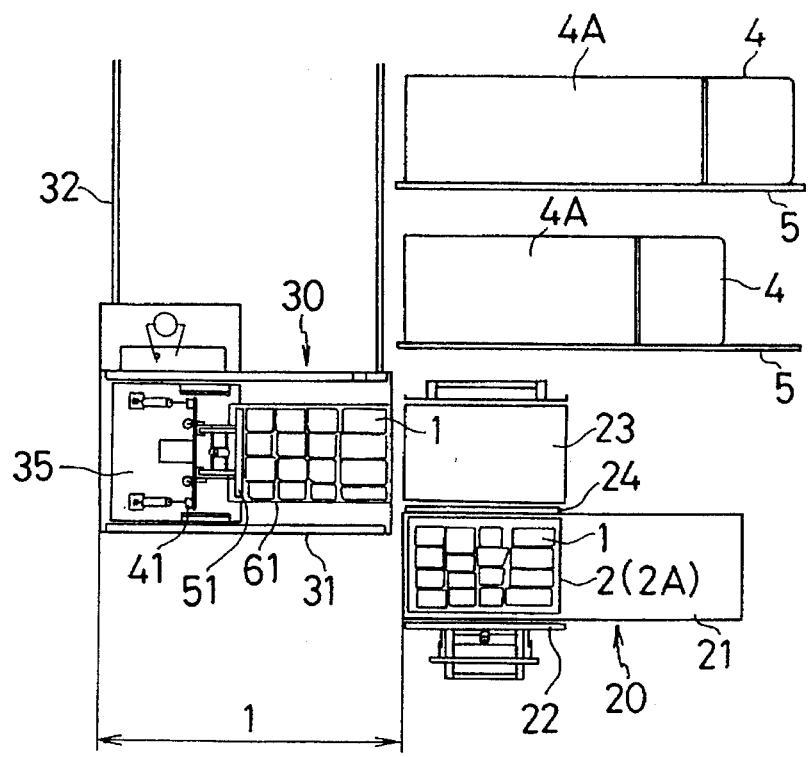
FIG. 9 is a schematic diagram showing a working space for loading in an example wherein the present invention is applied.

The number of types of the palletized load may be more or only one. This embodiment is restricted to two types of package style in order to efficiently stow the load 1 by matching it to the size of the truck 4. A 2-ton delivery truck comes in the following three sizes: Short, Standard, and Long. Stacking the palletized load as shown below makes them exactly fit the rear deck 4A of each different size of truck:

Short: 1 large package
Standard: 1 large package and 1 small package
Long: 2 large packages (C) Dispatch of tracks (FIGS. 9 and 10)

In the track yard where the shipping equipment 10 is located, a plurality of trucks 4 are parked with the loading sides of the rear decks thereof aligned, facing against the travel passage of the loading apparatus 30. At this time, the trucks 4 are parked in parallel to positioning lines 5. The positioning lines 5 are drawn at right angles to the traveling direction of the loading apparatus 30, so that the moving in/out and pushing forward direction of the loading apparatus 30 match the longitudinal direction of the rear decks 4A of the trucks 4. In this case, the loading apparatus 30 moves the load 1 in and out at right angles to the travelling direction; therefore, the lines 5 are accordingly drawn at right angles. The moving in/out direction of the load 1 may alternatively be set angularly with respect to the travelling direction; in this case, the lines 5 are accordingly drawn at an angle.

(D) Load transferring apparatus (FIG. 1 and FIG. 4)

The load transferring apparatus 20 has a load receiving conveyor 21, a load transferring pusher 22, and a load receiving deck 23.

The load receiving conveyor 21 receives the palletized load 1 from the forklift 3 and carries the palletized load to the front of the pusher 22.

The load transferring pusher 22 has a sheet holding hook (not shown) which holds the slip sheet 2A of the palletized load. While holding the slip sheet 2A with the sheet holding hook, the pusher 22 pushes out only the load 1 from the sheet 2A to the load receiving deck 23.

The load receiving deck 23 is disposed facing against the load receiving end of the travel passage of the loading apparatus 30 and it supports a load carriage 61 (to be discussed later) of the loading apparatus 30. At this time, the load carriage 61 is set so that the top surface of a slide plate 63 constituting the load carriage 61 is nearly flush with the top surface of the slip sheet 2A of the palletized load (strictly speaking, the top surface of the slide plate 63 is set slightly lower to ensure smooth transfer of the load 1 such as containers).

The side frame facing the load receiving deck 23 of the load receiving conveyor 21 is provided with a tiltable transferring plate 24. This transferring plate 24 fills the gap between the slide plate 63 of the load carriage 61 set on the load receiving deck 23 and the pallet 2 of the load receiving conveyor 21 at the time of transferring the load 1, thus preventing the load 1 from tumbling at the gap.

Figure 2:
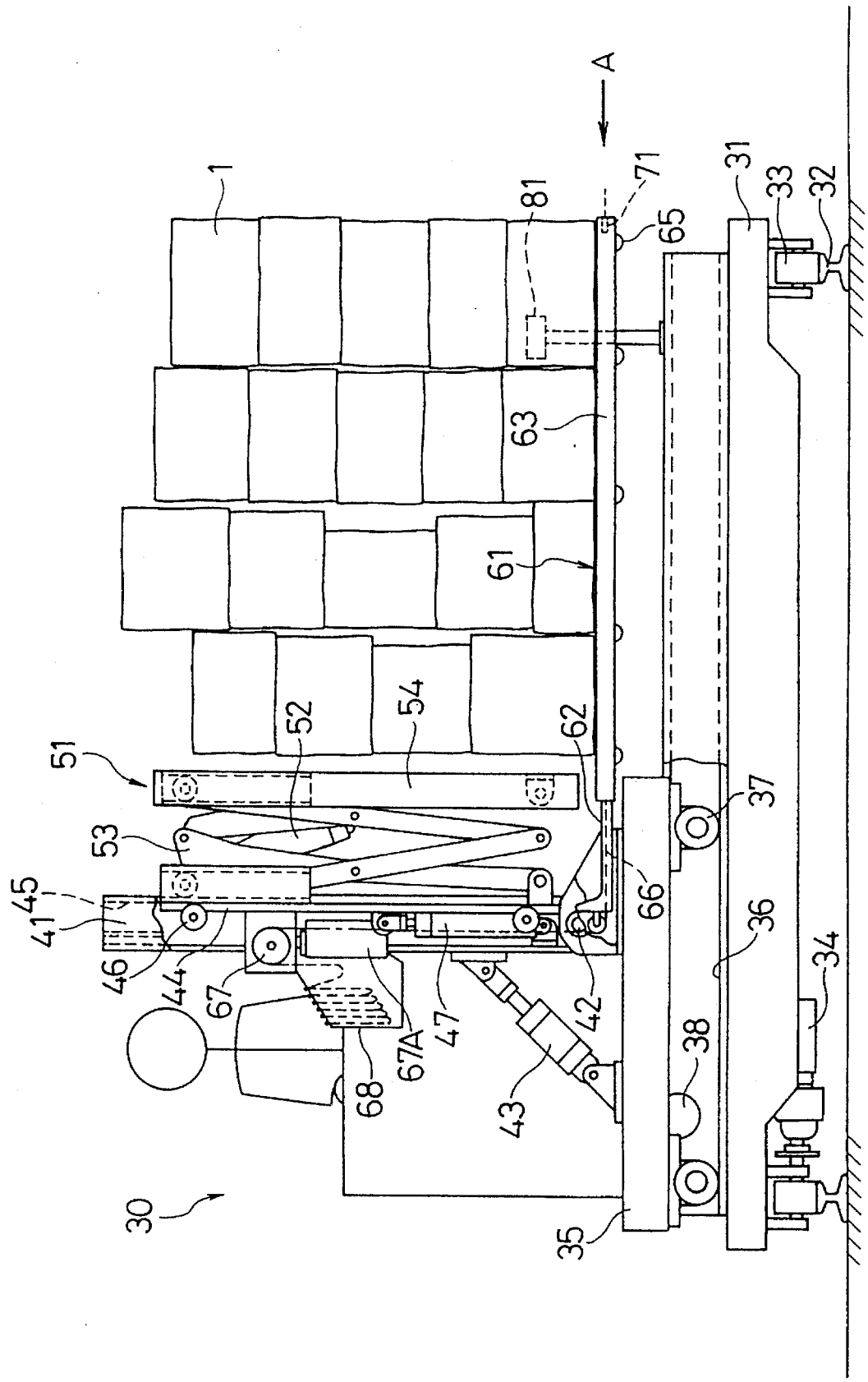
FIG. 2 is a schematic diagram showing a loading apparatus.
Figure 3A:
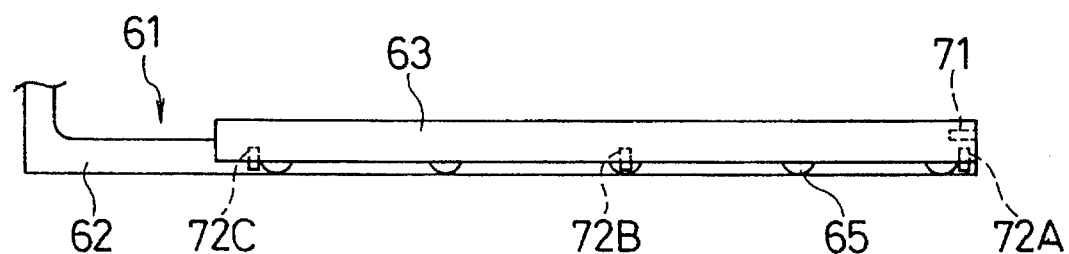
FIGS. 3A and 3B are schematic diagrams showing a load carriage.
Figure 3B:
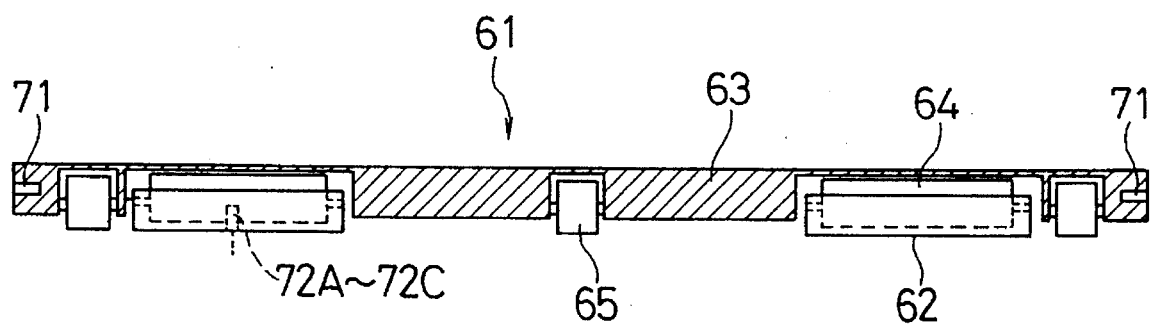

(E) Loading apparatus (FIG. 1, FIG. 2, and FIG. 3)

The loading apparatus 30 is provided with a travelling carriage 31 which travels along the loading ends of the rear decks of the trucks 4 parked at the truck yard. The travelling carriage 31 is equipped with wheels 33 set on rails 32 and is driven by a travel motor 34.

The loading apparatus 30 is equipped with a loader 35 which can be moved on the movable carriage 31 in the longitudinal direction of the rear decks of the trucks 4 (moved toward or away from the loading position of the rear decks 4A). The travelling carriage 31 has a loader rail 36. The loader 35 has wheels 37 rested on the loader rail 36 and is driven by a loader driving motor 38.

The loading apparatus 30 has a mast frame 41 installed on the loader 35. The mast frame 41 is tiltably supported on the loader 35 via a mast frame supporting shaft 42, the tilting angle thereof being changed by a tilting cylinder 43. A lifting frame 44 is mounted liftably on the mast frame 41 via a guide rail 45 and a cam follower 46. The lift amount of the lifting frame 44 can be adjusted by a lifting cylinder 47.

The loading apparatus 30 has a pusher 51 and the loading carriage 61 mounted on the lifting frame 44.

The pusher 51 has a pusher plate 54 at the distal end of a pantagraph 53 which is extended and contracted by a pusher cylinder 52 to allow the pusher plate 54 to be moved forward and backward. The pusher 51 pushes the load 1 on the loading carriage 61 and into the loading position.

The loading carriage 61 has a base plate 62 fixed to the lifting frame 44 and a slide plate 63 on which the load 1 is placed and which moves toward and away from the base plate 62, the load 1 being mounted on the slide plate 63 (FIG. 3).

The base plate 62 is equipped with a roller 64 on which the slide plate 63 is supported in such a manner that it is free to move in and out. More specifically, when the pusher 51 pushes the load 1 on the slide plate 63 toward the loading position, the slide plate 63 is pulled out from the base plate 62 and it moves together with the load 1 toward the loading position.

The slide plate 63 has wheels 65 and smoothly moves on the rear deck 4A of the truck 4 via the wheels 65. The slide plate 63 may have other means in place of the wheels 65 as long as it ensures smooth movement of the slide plate 63 on the rear deck 4A of the truck 4. For example, an air blowoff apparatus or the like which corresponds to the rear deck 4A may be used instead of the wheels 65, as long as it ensures that frictional force "b" between the slide plate 63 and the rear deck 4A is smaller than frictional force "a" between the load 1 and the slide plate 63 so that the slide plate 63 and the load 1 move together when the pusher 51 pushes the load 1 mounted on the slide plate 63.

The loading apparatus 30 also has a chain 66 for pulling back the slide plate 63, which has been pulled out from the base plate 62, the chain 66 being installed to the slide plate 63 at the end of the mast frame side. The chain 66 is wound up by a winding apparatus 67 provided on the lifting frame 44 to pull the slide plate 63 back. The wound-up chain 66 is hooked on a chain receiver 68 so that it is not entangled when stowed away. The winding apparatus 67 is driven by a motor 67A. The chain 66 laid between the winding apparatus 67 and the slide plate 63 is guided by a chain guide which is not shown.

The slide plate 63 has, on the leading edge, a limit switch 71 for detecting a wall. When the pusher 51 pushes in the load 1 mounted on the slide plate 63, the limit switch 71 detects that the slide plate 63 which moves together with the load 1 reaches the loading position close to and facing against the front wall on the rear deck 4A (or a wall 4B at the back of the rear deck 4A or a wall 1B of the preceding load 1 which has been already loaded).

Limit switches 72A through 72C are provided at three points on the bottom surface of the base plate 62 in the longitudinal direction of the rear deck. The limit switches 72A through 72C detect the top surface of the rear deck 4A so as to enable the base plate 62 to move on the top surface of the rear deck 4A with no gap between them when the load 1 is transferred to the rear deck 4A.

The loading apparatus 30 has a measuring apparatus 81 provided on the movable carriage 31 at the end thereof on the rear deck side. While the loading apparatus 30 is moving along the travel passage from the load receiving end to the truck 4 on to which the load 1 is stowed, the measuring apparatus 81 measures length L of the rear deck of the truck 4 by using a laser or the like when it passes the front of the rear deck 4A of the truck 4.

The following describes the load transferring procedure taken by the load transferring apparatus 20 and the loading procedure taken by the loading apparatus 30. Load transferring procedure (FIG. 4)

Figure 4A:
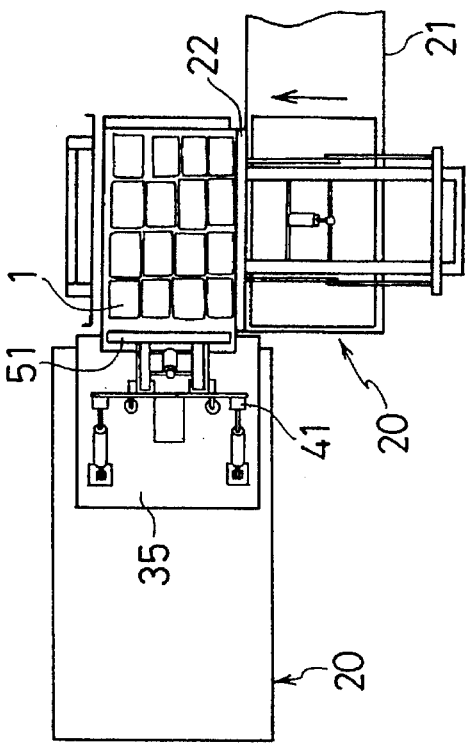
FIGS. 4A to 4D are schematic diagrams showing load transferring steps (1) through (4)

Step (1) A palletized load is placed on the load receiving conveyor 21 (FIG. 4A).

The load 1 which has been palletized is placed on the conveyor 21 by the forklift 3. The conveyor 21 carries the load 1 to the front of the pusher 22.

Figure 4C:
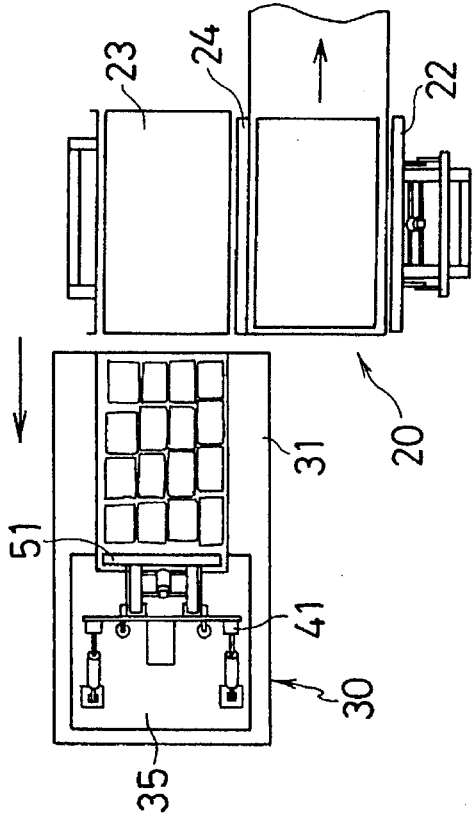
Figure 4B:
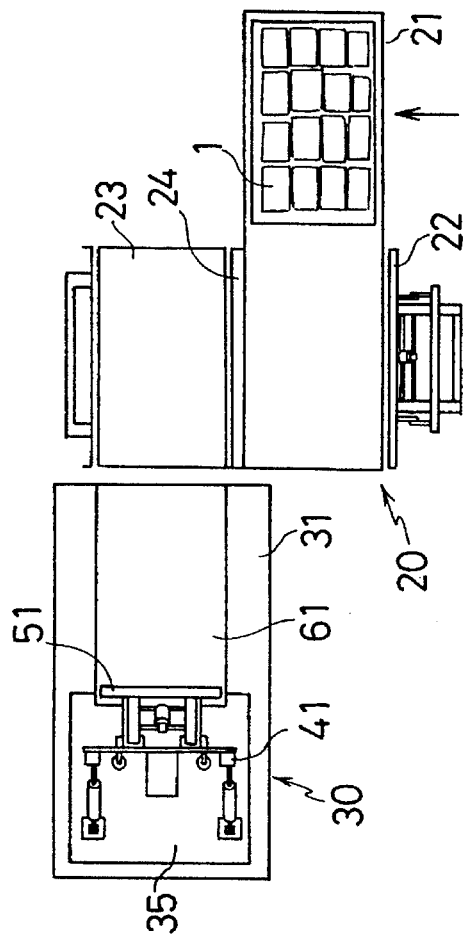

Step (2) The load carriage 61 of the loading apparatus 30 is moved on to the load receiving deck 23 (FIG. 4B).

The loading apparatus 30 advances the loader 35 to receive the load 1 and moves the base plate 62 and the slide plate 63 of the load carriage 61 on to the load receiving deck 23. The base plate 62 is moved down until the limit switch 72C located on the bottom side (mast frame 41 side) detects the top surface of the load receiving deck 23, then the base plate 62 is tilted forward until the limit switch 72A on the leading edge side detects the top surface of the load receiving deck 23 so as to enable the base plate 62 to move in close contact with the top surface of the load receiving deck 23. At this time, the top surface of the slide plate 63 will be almost flush with the top surface of the slip sheet 2A of the palletized load (strictly speaking, the top surface of the slide plate 63 is set slightly lower to ensure smooth transfer of the load 1 such as containers).

Step (3) Only the load 1 mounted on the pallet 2 is received (FIG. 4C).

With the slip sheet 2A held by the sheet holding hook (not shown) of the pusher 22 for transferring the load, the pusher 22 pushes only the load 1 (containers or carton boxes) placed on the slip sheet 2A to transfer the load to the slide plate 63. At this time, the load 1 is stacked on the pallet 2 in advance so that the load 1 is located near the leading edge of the slide plate 63.

Figure 4D:
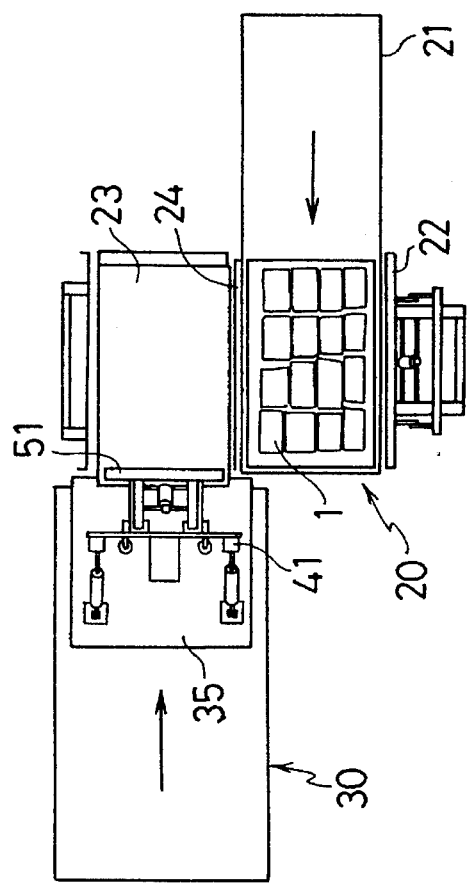

Step (4) The pallet 2 is ejected (FIG. 4D).

After the load 1 has been transferred to the slide plate 63, the loading apparatus 30 moves the loader 35 back and cause the base plate 62 and the slide plate 63 of the loading carriage 61 to go back from the load receiving deck 23. The empty pallet 2 is then ejected by the load receiving conveyor 21.

(Loading Procedure) (FIG. 5 through FIG. 8)

Figure 5A:
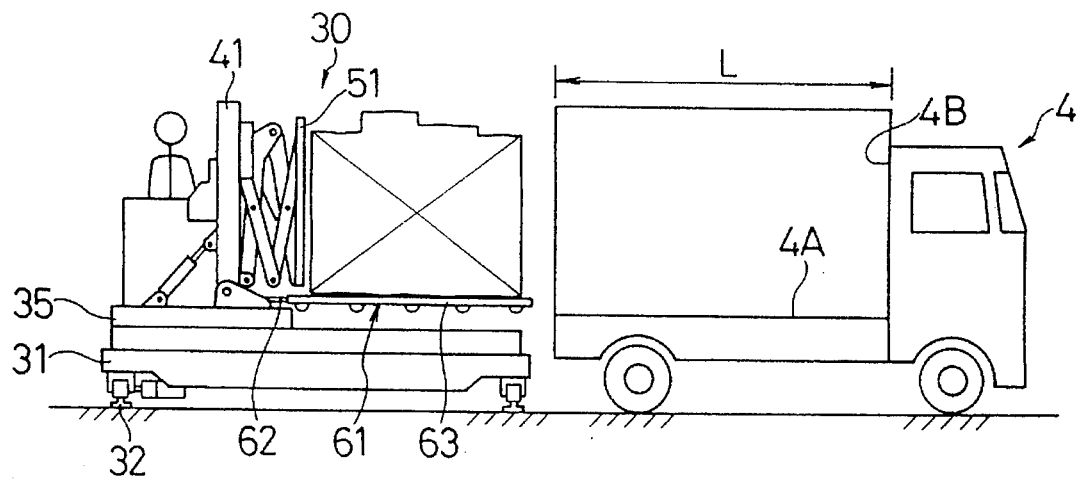
FIGS. 5A to 5C are schematic diagrams showing loading steps (1) through (3)

Step (1) The load 1 is moved to the truck 4 to be loaded (FIG. 5A).

Before starting the loading, the worker enters into the controller of the loading apparat 30, the type (short, standard, or long) of the truck 4 to be loaded and the number of the position in which the truck is parked.

After the loading apparatus 30 receives the load 1 as previously described, the loading apparatus 30 is moved to the truck 4 on which the load 1 is to be stowed. At this time, length L of the rear deck of the target truck 4 is measured by the measuring apparatus 81. As described above, the measuring apparatus 81 is installed on the traveling carriage 31 of the loading apparatus 30. While the traveling carriage is moving from the load receiving deck 23 to the target truck 4, the measuring apparatus 81 measures, using a laser or the like, the length of the rear deck 4A as it passes the front of the rear deck 4A of the truck 4.

Based on the measurement result, the type of the truck 4 is matched with the data which has been entered in the controller; if the data does not match, then the operator will be notified of the discrepancy. For instance, if the measurement result shows that the truck is the short type while the type the operator entered is "standard type," then the operator will be notified of this discrepancy. Accordingly, the operator must decide whether he should stow the small load 1 onto another truck 4. The following will explain this in more detail. One large load package and one small load package can be stowed on the standard type truck; therefore, based on this information, these two load packages are arranged and stacked beforehand in such a manner that the small load package includes the articles to be delivered to one type of store first while the large load package includes the articles to be delivered to other stores next. Thus, when the operator assumed that the truck was the standard type, he needs to first stow the large load package and then the matching small load package. If, however, the operator has stowed the large load package onto the short type truck by mistake, then he will not be able to stow the matching small load package. Hence, in order to avoid such a problem, the system described above enables the operator to find such a mistake, so that he will be able to decide whether he should stow the load onto another standard type truck or take the load out and replace it with another load package for the short type truck.

When the measurement result shows the coincidence with the data which has been entered in advance, the operator starts stowing the load 1 onto the truck 4.

As soon as the loading apparatus 30 is set for the target truck 4, it automatically moves to position itself at the rear deck 4A of the target truck 4. At this time, the loading apparatus 30 does not stop because it detects the truck 4. It stops by referring to the dogs provided in accordance with the positioning lines 5. Accordingly, if the truck 4 is dislocated from the positioning line 5, then the loading apparatus 30 cannot be accurately positioned at the rear deck 4A. In this case, the loading apparatus 30 is manually moved for re-positioning.

Figure 5B:
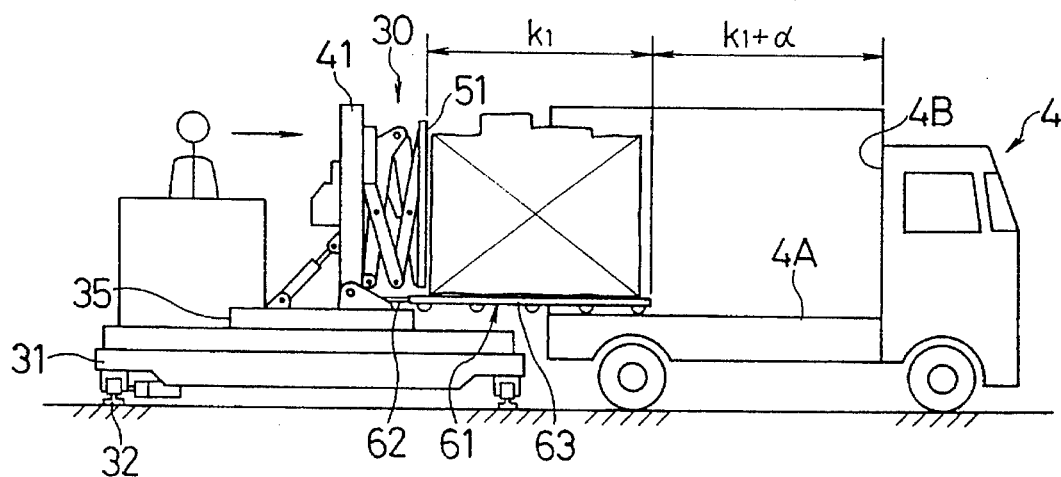

Step (2) The loader 35 is moved and the loading carriage 61 is moved onto the rear deck 4A (FIG. 5B).

The loader 35 is moved to the rear deck 4A and the load 1 and the loading carriage 61 are moved to the rear deck 4A.

At this time, the length of the load $k_1 + \alpha$ from the back of the deck 4A must be left. Since length L of the deck has already been measured, the loader 35 will be moved the following distance:

$$\text{Distance of Movement} = (L - (k_1 + \alpha)) + a \tag{1}$$

(a: Distance (fixed) between the edge surface of the rear deck and the leading edge of the slide plate 63) (Length k of load: 2.2 m for large load; 1.1 m for small load)

When the loading carriage 61 is moved on to the rear deck 4A, the posture of the base plate 62 is automatically adjusted so that it follows the rear deck 4A. More specifically, the base plate 62 is set slightly higher than the top surface of the rear deck 4A and the loading carriage 61 is moved on to the rear deck 4A with the leading edge of the loading carriage 61 slightly raised, so that the loading carriage 61 moves down until the central limit switch 72B mounted on the base plate 62 detects the top surface of the rear deck 4A. The loading carriage 61 is then tilted until the limit switch 72C located at the leading edge detects the top surface of the rear deck 4A, thus enabling the base plate 62 to move closely on the top surface of the rear deck 4A.

Figure 5C:
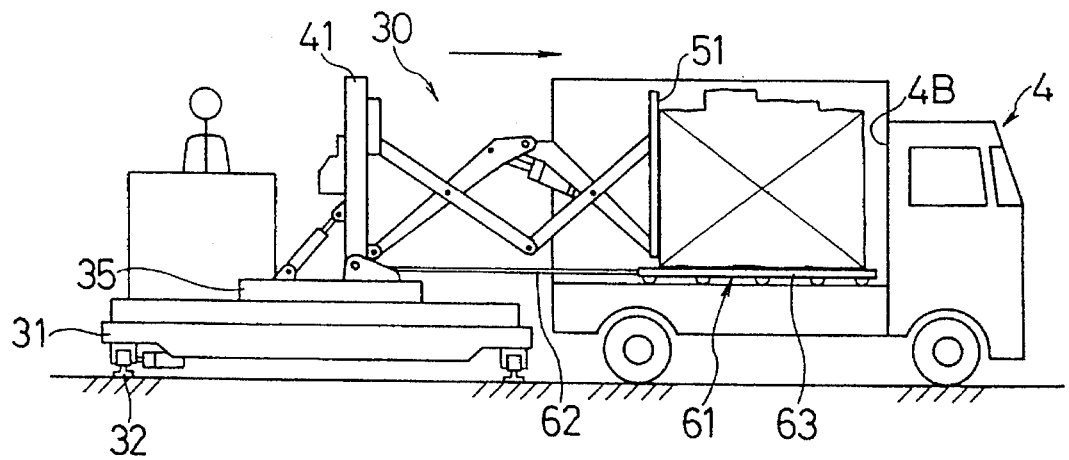

Step (3) The load 1 is pushed in together with the base plate 63 by the pusher 51 (FIG. 5C).

The load 1 is pushed by the pusher 51. When the load 1 is pushed, the slide plate 63 slides on the base plate 62 to move on to the rear deck 4A together with the load 1.

Since the slide plate 63 is provided with the wheels 65, it can smoothly move on the rear deck 4. At this time, the load 1 is in close contact with the slide plate 63 and therefore it does not shift.

The stroke of the pusher 51 exceeds 2.2 m. The leading edge of the slide plate 63 can be accurately positioned at the wall surface 4B at the back of the rear deck by stopping the pushing operation of the pusher 51 when the limit switch 71 located at the leading edge of the slide plate 63 detects the wall surface 4B at the back of the rear deck 4A.

Alternatively, the stroke of the pusher 51 may be set to $(2.2 \text{ m}+\alpha)$ with the pusher be allowed to extend to the full stroke thereof. This also allows the leading edge of the slide plate 63 to be accurately positioned at the wall surface 4B at the back of the rear deck. The method using the limit switch 71 is adopted to enable the load 1 to be accurately moved to the back of the rear deck even if the length of the rear deck was not measured accurately.

While the load 1 is being stowed, the position of the base plate 62 with respect to the rear deck 4A is corrected. When the load 1 is stowed, the rear deck 4A lowers due to the weight of the load. If the limit switches 72B, 72C detect such lowering, then the loading work is interrupted and the posture of the base plate 62 described in (2) above is corrected. As an alternative, the position of the base plate 62 may be such as to always follow the level of the rear deck 4A without interrupting the loading work. In this example, the loading work is interrupted because the rear deck 4A suddenly lowers. If the base plate 62 fails to follow the sudden lowering of the rear deck in time, then the base plate 62 and the slide plate 63 bend, possibly preventing the slide plate 63 from being smoothly pulled back.

Figure 6A:
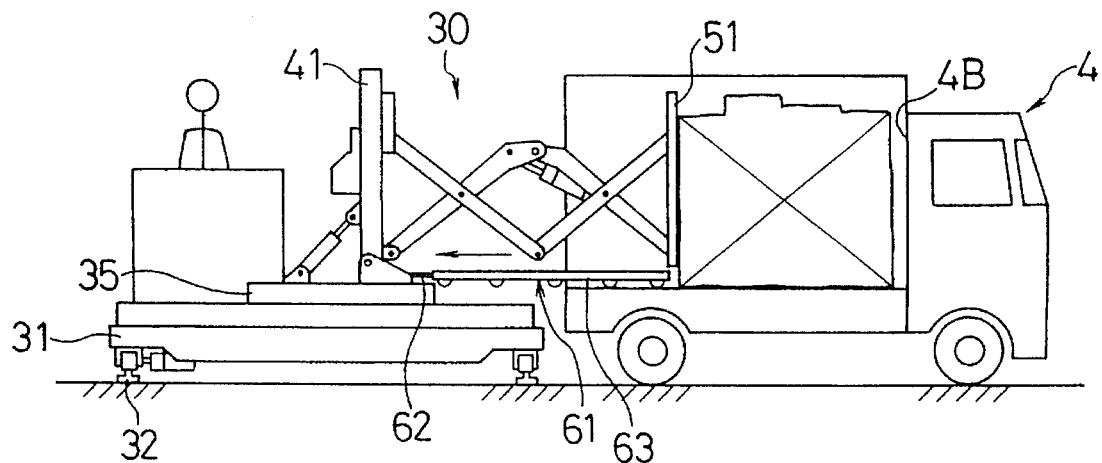
FIGS. 6A to 6C are schematic diagrams showing loading steps (4) through (6)

Step (4) The base plate 63 is pulled back and the load 1 is set down (FIG. 6A).

While keeping the pusher 51 in the same position, the slide plate 63 is pulled back to set the load 1 down on the rear deck 4A.

The load 1 is set down without being pushed on to the rear deck 4A; therefore, it does not fall forward from the frictional force generated between the load 1 and the rear deck 4A. Further, the load 1 is stacked near the leading edge of the slide plate 63 and hence, the load 1 is very close to the wall surface 4B at the back of the rear deck 4A. Accordingly, even if the load 1 should be about to tumble due to the step formed between the slide plate 63 and the rear deck 4A, it will lean against the wall 4B which supports it.

The load 1 is moved on to the rear deck 4A, beginning with the front edge, and the rear deck 4A gradually lowers. When the base plate 62 reaches a point higher than the top surface of the rear deck 4A, however, the base plate 62 and the slide plate 63 provided on the rear deck 4A both bend, preventing the slide plate 63 from being smoothly pulled back through the base plate 62. To avoid this problem, the correction of the posture of the base plate 62 described above is carried out in this case also in order to ensure that the base plate 62 closely follows the top surface of the rear deck 4A.

Figure 6B:
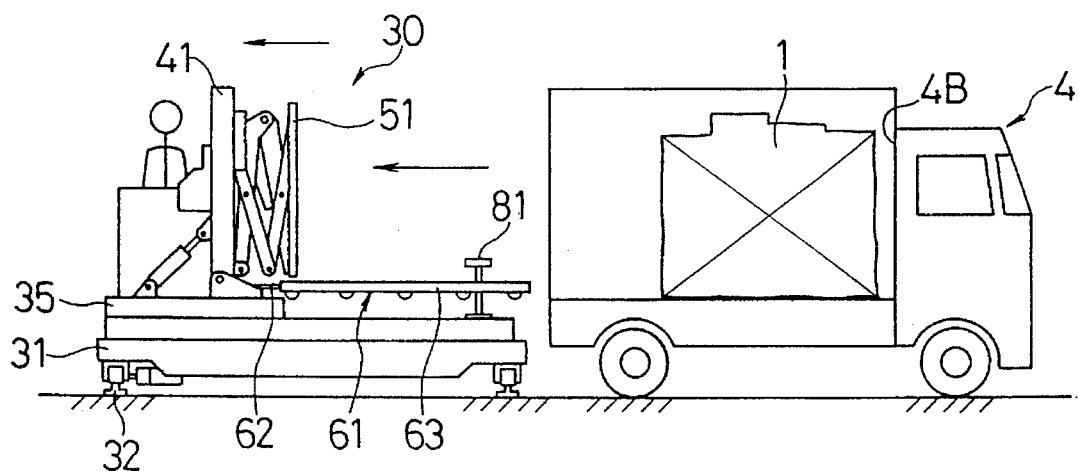

Step (5) The pusher 51 and the loader 35 are moved back (FIG. 6B).

The pusher 51 is contracted and the loader 35 is moved back to the home position thereof. If another load 1 is to be stowed, then the operator moves to the load receiving end with respect to the load transferring apparatus 20 to receive the next load 1.

Figure 6C:
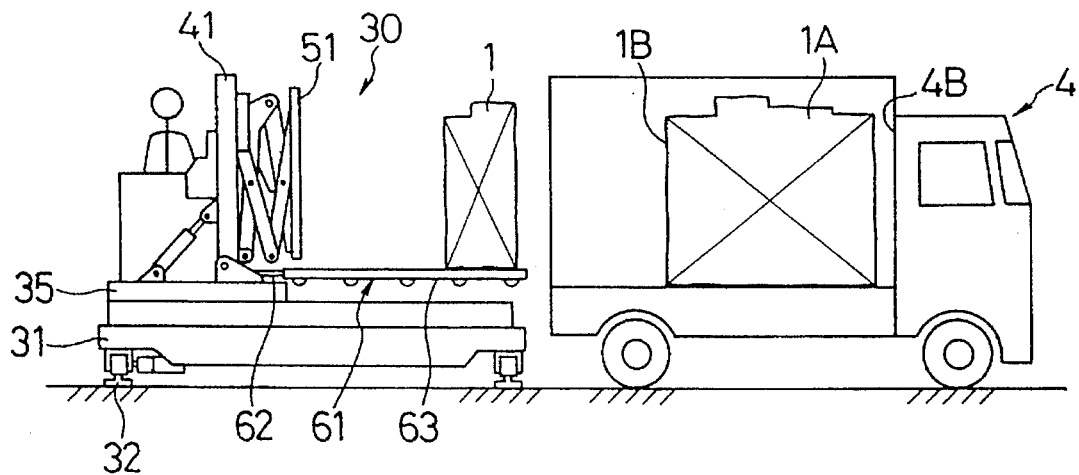

Step (6) The next load 1 is received and carried to the truck 4 (FIG. 6C).

When stowing another load 1 (on the standard or long truck 4), the load 1 is stacked near the leading edge of the slide plate 63 as in the case of the preceding load.

Figure 7A:
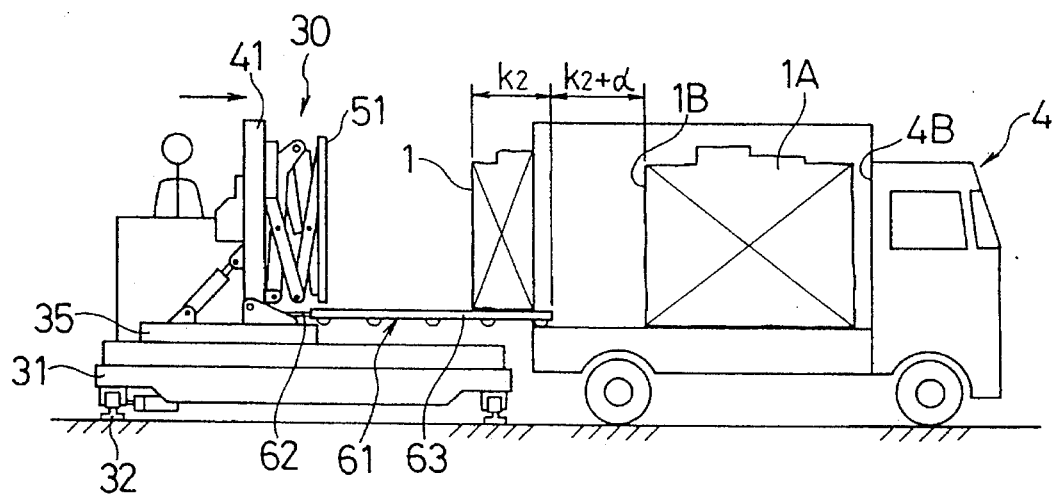
FIGS. 7A to 7C are schematic diagrams showing loading steps (7) through (9)
Figure 7B:
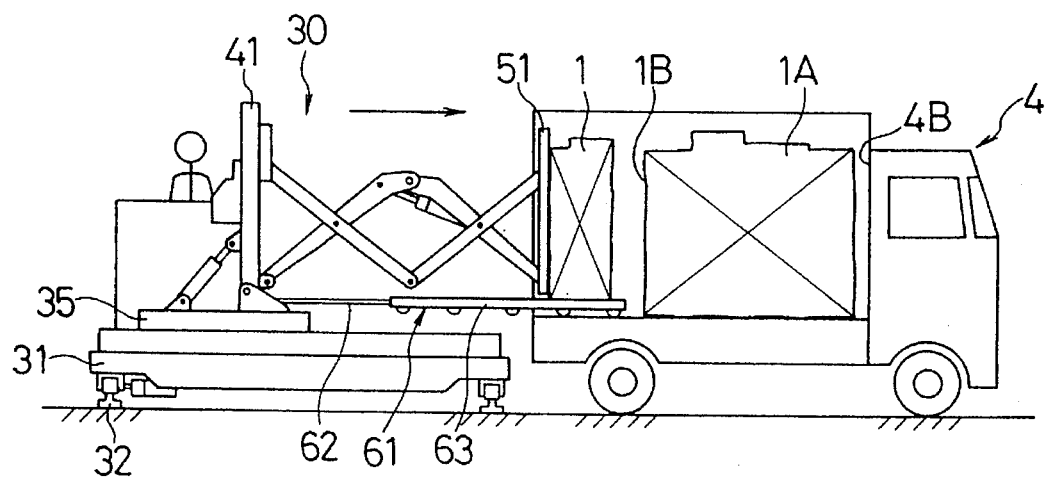
Figure 7C:
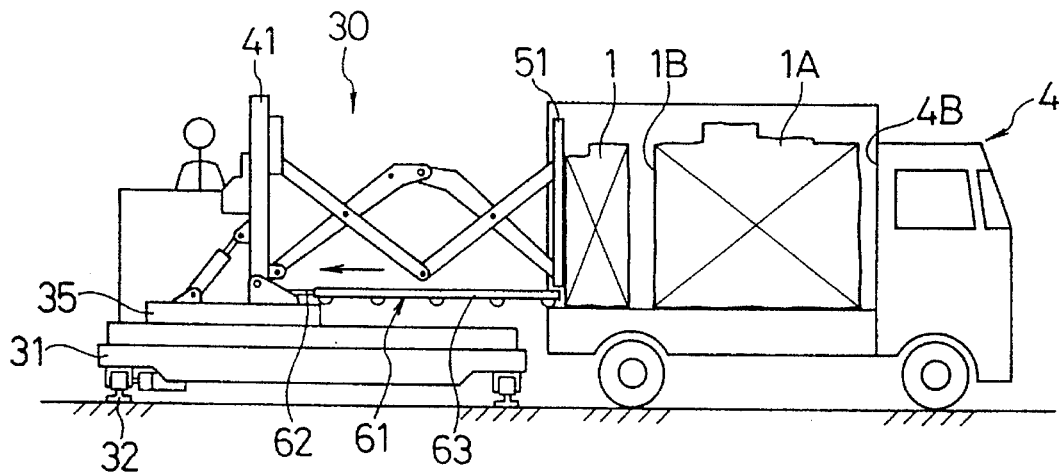

Step (7) The loader 35 is moved (FIG. 7C).

The position in which the loading carriage 61 is to be set on the rear deck is determined from length L of the rear deck, which has been measured in step (1) above, and length $K_1$ of the stowed load, then the loader 35 is moved toward the rear deck 4A.

Length $k_2$ of the load is 1.1 m; therefore, $$\text{Movement}=L-k_1-(k_2+\alpha)+a \tag{2}$$

Moving the loader 35 by the distance given by the above formula makes it possible to move the loader 61 on to the rear deck with only a gap, $k_2+\alpha$, which is equivalent to the length of the load, left between the already stowed load 1A and the leading edge of the slide plate 63.

Step (8) The load 1 is pushed in together with the slide plate 63 by the pusher 51 (FIG. 7B).

The load 1 is pushed by the pusher 51, so that the load 1 and the slide plate 63 are moved on to the rear deck 4A.

As described in step (3), the pusher 51 stops pushing when the limit switch 71 located at the leading edge of the slide plate 63 detects the load 1.

Also as in the alternative described previously, the full stroke of the pusher 51 may be set to $(2.2 \text{ m}+\alpha)$ and the pusher 51 may be pushed to the full stroke.

Step (9) The slide plate 63 is pulled back and the load 1 is set down (FIG. 7C).

With the pusher 51 kept in the same position, the slide plate 63 is pulled back and the load 1 is set down on the rear deck 4A.

Figure 8:
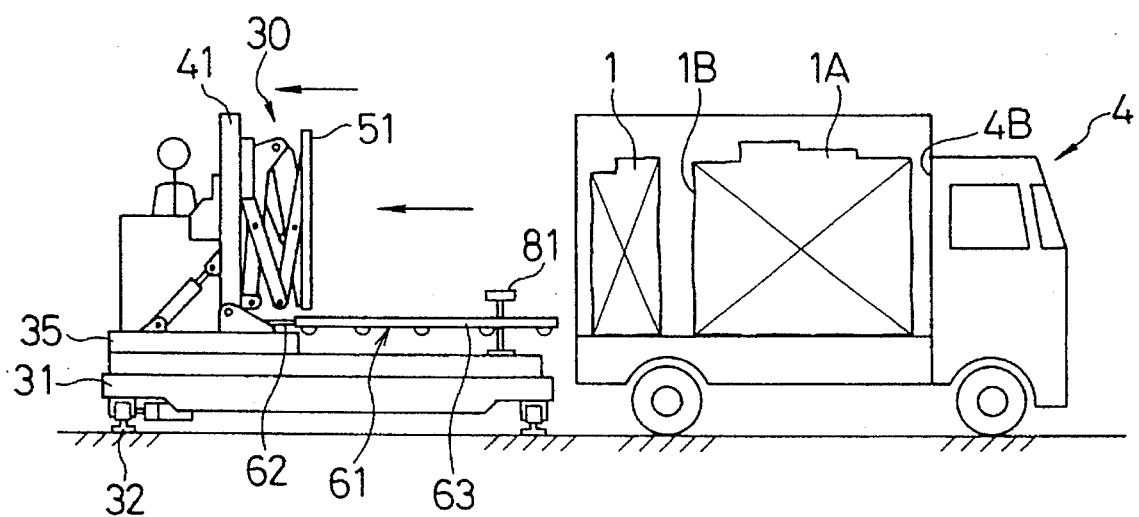
FIG. 8 is a schematic diagram showing a loading step (10)

Step (10) The pusher 51 and the loader 35 are moved back (FIG. 8).

The pusher 51 and the loader 35 are moved back to get ready for serving the next truck 4.

The operations of the present embodiment will now be described.

The load 1 and the slide plate 63 are moved by the pusher 51 to a loading position close to and facing against the front wall (the wall surface 4B of the rear deck 4A or the wall surface 1B of the preceding load 1 which has already been stowed) on the rear deck 4A, then the load 1 is stowed by pulling only the slide plate 63 out with the pusher 51 kept in the same position. Hence, even if the load 1 tumbles when the slide plate 63 is drawn out, the load 1 will be supported by the front wall on the rear deck 4A, thus preventing the load from collapsing.

The load 1 and the slide plate 63 are moved to the position near and facing against the front wall on the rear deck 4A when they are pushed in by the pusher 51. This allows the load 1 to be appropriately positioned near the front wall at the back of the rear deck 4A in a stable manner. The arrangement also protects the load 1 from being pushed too far as to be crushed. It also prevents the load 1 from being insufficiently pushed, leaving an insufficient loading space on the rear deck 4A for the next load 1.

The load 1 to be placed on the slide plate 63 is moved close to the rear deck 4A of the slide plate 63 in advance. Therefore, when setting the load 1 in the loading position near and facing against the front wall on the rear deck 4A by pushing the load 1 by the pusher 51, the load 1 is set in the aforesaid loading position together with the slide plate 63 rather than being slid on the slide plate 63 to the rear deck 4A from the middle of the slide plate 63. This prevents the load 1 from tumbling or collapsing, which may occur if the load 1 would slide on the slide plate 63 before the load 1 is set in the loading position.

In addition, the load 1 is moved close to the leading edge of the slide plate 63 to mount it on the slide plate 63 which is then moved to the initial position (away from the back of the rear deck 4A by the length of the load). Then, the load 1 can be accurately moved to the loading position at the back of the rear deck 4A merely by pushing it for a certain distance by the pusher 51, thus preventing such problems as pushing the load 1 too far and crushing it or pushing it insufficiently, leaving an insufficient stowing space for the next load.

The loading apparatus 30 has a load carriage 61 comprised of the base plate 62 and the slide plate 63. After pusher 51 pushes the load 1 and the slide plate 63 to the loading position near and facing against the front wall on the rear deck 4A, only the slide plate 63 can be pulled back, with the pusher 51 being kept in the same position. Thus, the loading apparatus 30 can be used to implement the functions described above.

The slide plate 63 is provided with the wheels 65. This ensures that frictional force "b" generated between the slide plate 63 and the rear deck 4A is smaller than frictional force "b" generated between the slide plate 63 and the load 1 when the pusher 51 pushes the load 1. Thus, the slide plate 63 and the load 1 can be securely moved together on the rear deck.

The loading apparatus 30 is equipped with a movable carriage 31 which moves along the loading edge of the rear deck of the truck 4 and a loader 35 which moves on the movable carriage 31 in the longitudinal direction of the rear deck to load the truck 4. Hence, the usual turning space required by the conventional forklift is no longer necessary and therefore, the loading work space for the load 1 can be reduced.

In the shipping equipment 10, the moving space at the front of the truck yard for the loading apparatus according to the present invention shown in FIG. 9 is about 40% of the space required for conventional loading apparatus shown in FIG. 10.

Second Embodiment (FIG. 12 through FIG. 18)

The second embodiment differs from the first embodiment only in one aspect; the loading apparatus 30 has a coupling device 110.

Figure 12:
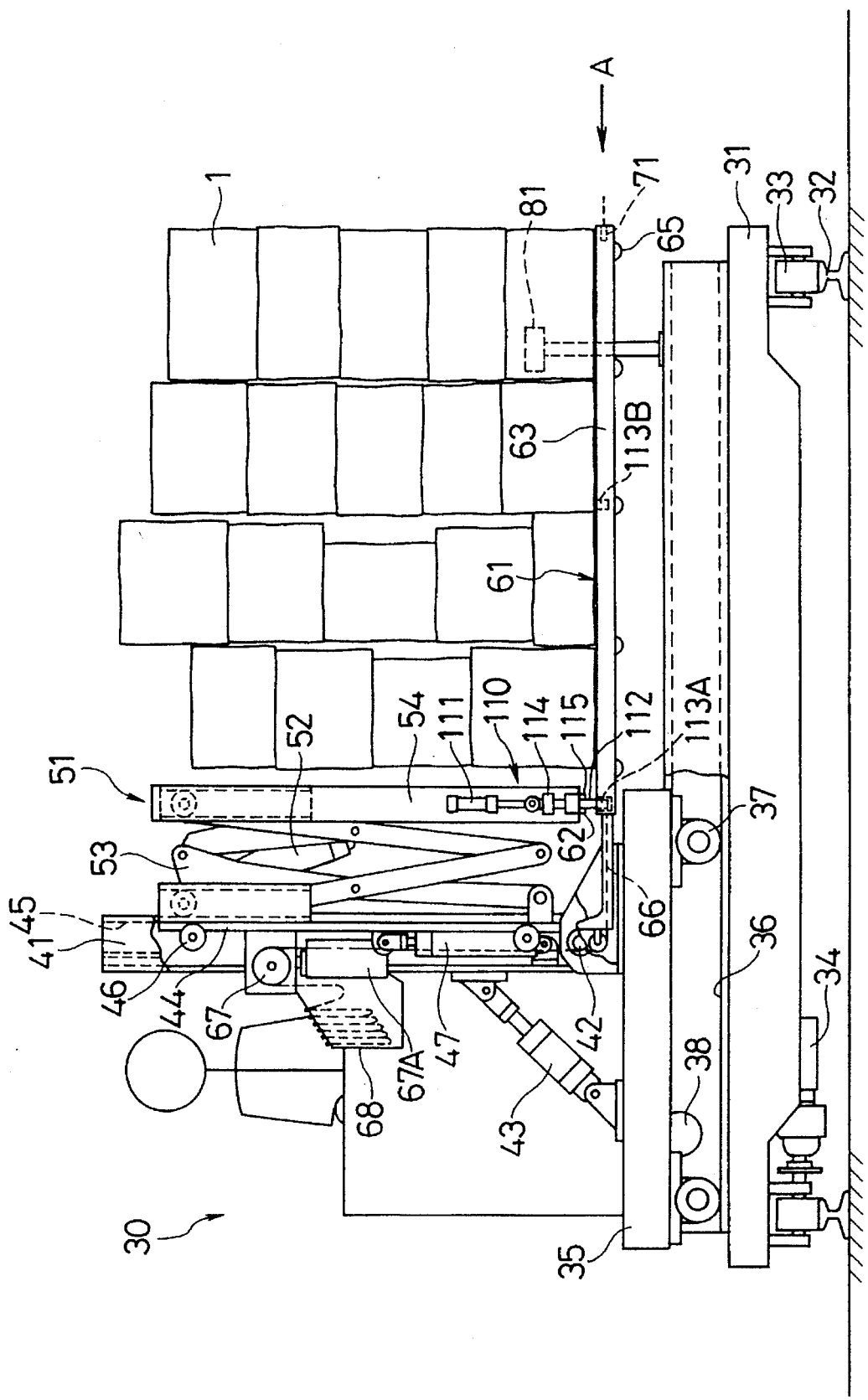
FIG. 12 is a schematic diagram showing another loading apparatus in accordance with the present invention.
Figure 13A:
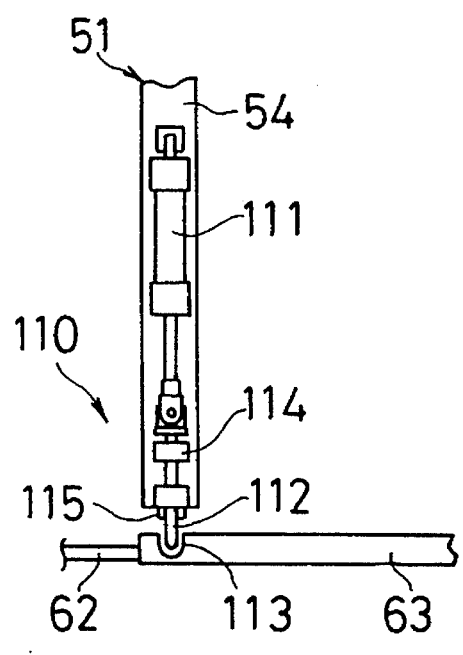
FIGS. 13A and 13B are schematic diagrams showing a coupling device.

Specifically, the pusher 51 and the slide plate 63 can be connected through the coupling device 110. As shown in FIG. 12 and FIG. 13, the coupling device 110 has a coupling pin 112 provided on the distal end of the piston rod of a cylinder 111 which is fixed on the side of the pusher plate 54. The coupling pin 112 is removably engaged in an engaging hole 113 provided in the side edge of the slide plate 63. Numeral 114 denotes a guide for the coupling pin 112.

In this embodiment, the slide plate 63 has two engaging holes 113A and 113B. The engaging hole 113A is provided in the proximal end of the slide plate 63; it is used for stowing the load 1 in a large package. The engaging hole 113B is provided in the middle of the slide plate 63; it is used for stowing the load 1 in a small package.

The pusher 51 and the slide plate 63 are coupled in accordance with either (a) or (b) described below.

(a) When stowing the load 1 in the large package, the pusher 51 and the slide plate 63 are connected by engaging the coupling pin 112 in the engaging hole 113A by the cylinder 111, with the pusher 51 in the home position thereof and the slide plate 63 also in the home position thereof.

Figure 13B:
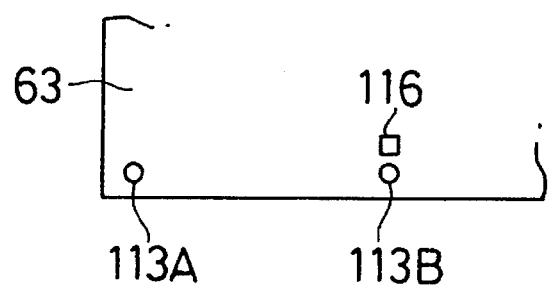

(b) When stowing the load 1 in the small package, while advancing the pusher 51, a detector 115 such as an optical sensor provided at the bottom of the pusher plate 54 detects an engaging hole display 116 such as a reflecting plate which is aligned to the engaging hole 113B in the slide plate 63. As soon as the detector 115 detects the engaging hole display 116, the pusher 51 is stopped (FIG. 13B). Then the cylinder 111 is actuated to engage the coupling pin 112 in the engaging hole 113B, thereby connecting the pusher 51 with the slide plate 63.

The number of the engaging holes 113 provided in the side edge of the slide plate is not limited to two (113A and 113B). Three or more engaging holes may be provided so that the position at which the pusher 51 and the slide plate 63 are coupled can be adjusted in many positions.

Further, the coupling device 110 may alternatively be provided with a suction pad 112A on the distal end of the piston rod of the cylinder 111 as shown in FIG. 14A, so that the suction pad 112A is removably engaged to the side edge of the slide plate 63.

Likewise, the coupling device may alternatively be provided with an engaging hook 112B on the distal end of the piston rod of the cylinder 111 as shown in FIG. 14B, so that the engaging hook 112B may be removably engaged to a tooth of a rack 117 installed on the side edge of the slide plate 63.

As a further alternative, the coupling device 110 may be provided with a rubber pad 112C on the distal end of the piston rod of the cylinder 111 as shown in FIG. 14C, so that the rubber pad 112C is pressed against the top surface of the slide plate 63 in order to connect the pusher 51 with the slide plate 63. When this occurs, the pusher 51 and the slide plate 63 are connected by the coupling device 110 at the point where the pusher plate 54 contacts the load 1. A detector 120 for detecting the contact between the pusher plate 54 and the load 1 is employed. The detector 120 has a load detecting plate 121 provided over the full width of the pusher plate 54 and a limit switch 122 which is turned ON/OFF by the sliding movement of the load detecting plate 121. The cylinder 111 of the coupling device 110 will extend when the limit switch 122 turns ON and it causes the rubber pad 112C to be pressed against the top surface of the slide plate 63.

In this case, the base plate 62 is provided with rollers 64 whereon the slide plate 63 moves back and forth. More specifically, when the pusher 51 pushes the slide plate 63 connected thereto through the coupling device 110 toward the loading position, the slide plate 63 moves toward the loading position, being pulled out from the base plate 62 and mounting the load 1 thereon.

The following describes the loading procedure taken by the loading apparatus 30 of the second embodiment.

(Loading Procedure) (FIG. 15 through FIG. 18)

Figure 15A:
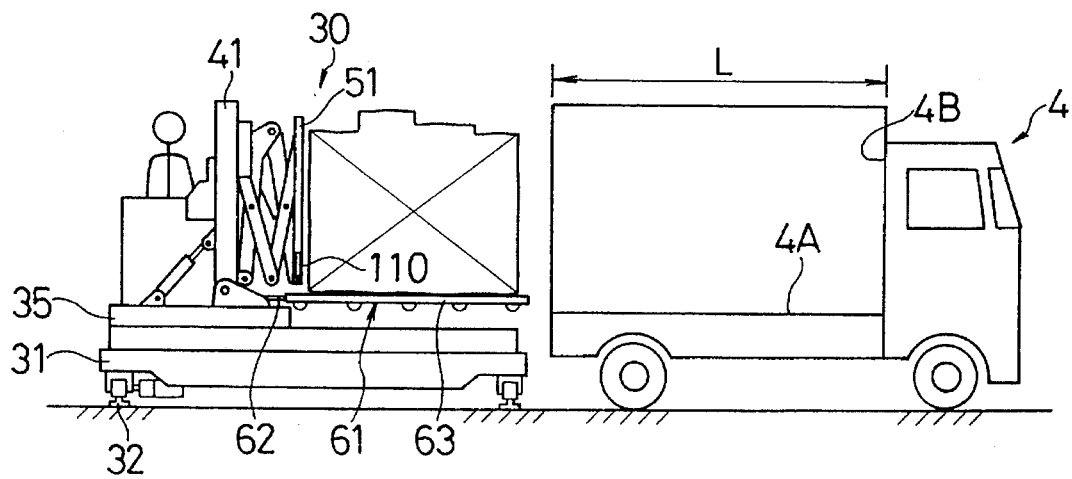
FIGS. 15A to 15C are schematic diagrams illustrative of steps (1) through (3) of another loading procedure in accordance with the present invention.

(1) The load 1 (large package) is moved to the truck 4 to be loaded (FIG. 15A).

Before starting the loading, the operator enters into the controller of loading apparatus 30 the type (short, standard, or long) of the truck 4 to be loaded and the number of the location where the truck is parked.

In the next step, after the loading apparatus 30 receives the load 1 as previously described, the loading apparatus 30 is moved to the truck 4 onto which the load 1 is to be stowed. At this time, length L of the rear deck of the target truck 4 is measured by the measuring apparatus 81. As described above, the measuring apparatus 81 is installed on the movable carriage 31 of the loading apparatus 30; while the movable carriage is moving from the load receiving deck 23 to the target truck 4, the measuring apparatus 81 measures, using a laser or the like, the length of the rear deck 4A as it passes the front of the rear deck 4A of the truck 4.

Based on the measurement, there is a check of whether the type of the truck 4 matches the data which has been entered in the controller; if it does not match, then the operator will be notified of the discrepancy. For instance, if the measurement result shows that the truck is the short type while the type the operator entered is "standard type," then the operator will be notified of this discrepancy, enabling the operator to recognize that he will not be able to stow the small load 1 next. Accordingly, the operator must decide whether he should stow the small load 1 onto another truck 4. The following will explain this in more detail. One large load package and one small load package can be stowed on the standard type truck; therefore, based on this information, these two load packages are arranged and stacked beforehand in such a manner that the small load package includes the articles to be delivered to certain stores first while the large load package includes the articles to be delivered to other stores next. Thus, when the operator assumed that the truck was the standard type, he knew he needed to first stow the large load package and then the matching small load package. If, however, the operator has stowed the large load package onto the short type truck by mistake, then he will not be able to stow the matching small load package. Hence, in order to avoid such a problem, the system described above enables the operator to find such a mistake, so that he will be able to decide whether he should stow the load onto another standard type truck or take the load out and replace it with another load package for the short type truck.

When the measurement result shows the coincidence with the data which has been entered in advance, the operator starts stowing the load 1 onto the truck 4.

As soon as the loading apparatus 30 is set for the target truck 4, it automatically moves to position itself at the rear deck 4A of the target truck 4. At this time, the loading apparatus 30 does not stop because it detects the truck 4; it stops by referring to the dogs provided in accordance with the positioning lines 5. Accordingly, if the truck 4 is dislocated from the positioning line 5, then the loading apparatus 30 cannot be accurately positioned at the rear deck 4A. In this case, the loading apparatus 30 is manually moved for re-positioning.

Figure 15B:
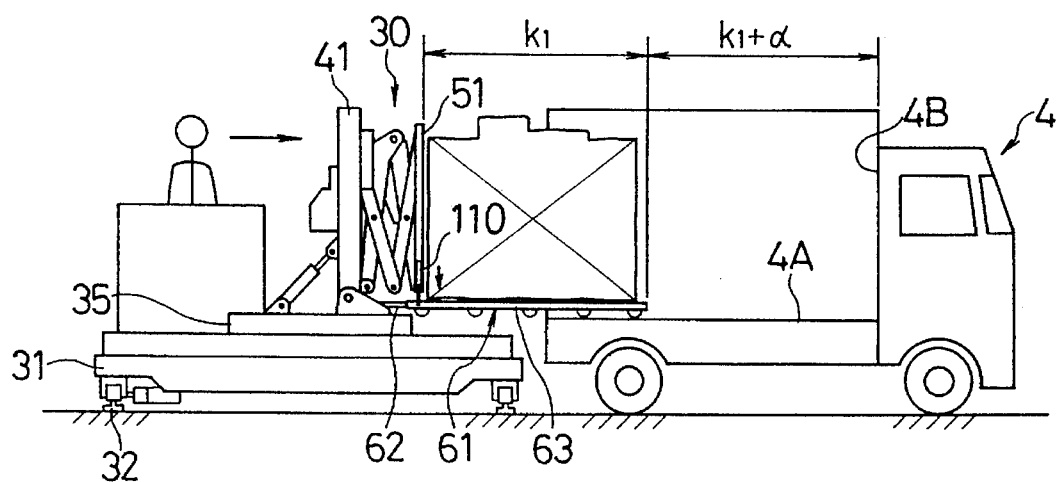

(2) The loader 35 is moved and the loading carriage 61 is moved onto the rear deck 4A (FIG. 15B).

The loader 35 is moved to the rear deck 4A and the load 1 and the loading carriage 61 are moved onto the rear deck 4A.

At this time, the length of the load $k_1+\alpha$ from the back of the deck 4A must be left. Since length L of the deck has already been measured in (1) above, the loader 35 will be moved by the following distance:

$$\text{Movement} = (L - (k_1 + \alpha)) + a \quad (1)$$

(a: Distance (fixed) between the edge surface of the rear deck and the leading edge of the slide plate 63) (Length k of load: 2.2 m for large load; 1.1 m for small load)

When the loading carriage 61 is moved onto the rear deck 4A, the position of the base plate 62 is automatically adjusted so that it follows the rear deck 4A. More specifically, the base plate 62 is set slightly higher than the top surface of the rear deck 4A and the loading carriage 61 is moved onto the rear deck 4A with the leading edge of the loading carriage 61 slightly raised, so that the loading carriage 61 moves down until the central limit switch 72B mounted on the base plate 62 detects the top surface of the rear deck 4A. The loading carriage 61 is then tilted until the limit switch 72C located at the leading edge detects the top surface of the rear deck 4A, thus enabling the base plate 62 to move closely on the top surface of the rear deck 4A.

While the load carriage 61 is being moved onto the rear deck 4A, the pusher 51 and the slide plate 63 are linked through the coupling device 110. To be specific, the coupling pin 112 is engaged in the engaging hole 113A by the cylinder 111.

Figure 15C:
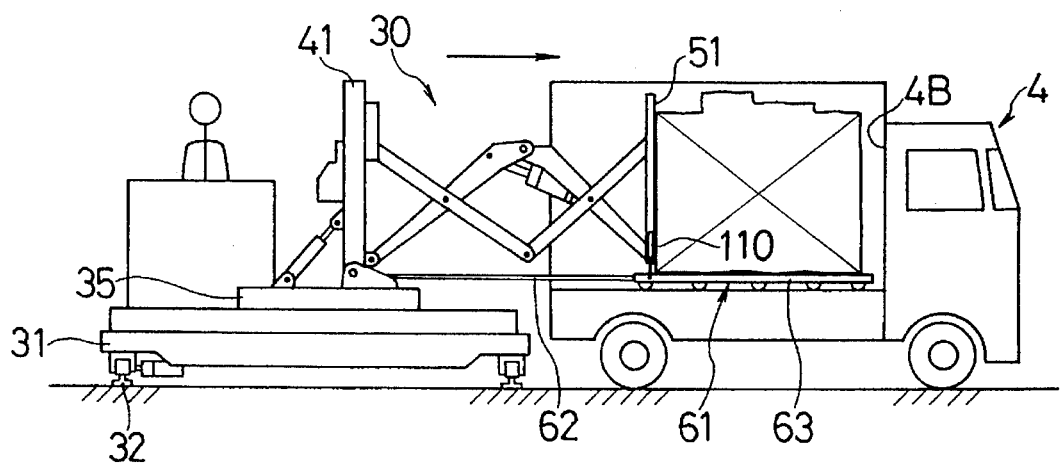

(3) The base plate 62 is pushed in by the pusher 51 (FIG. 15C).

The slide plate 63 is pushed by the pusher 51 via the coupling device 110. The slide plate 63 slides on the base plate 62 to move on to the rear deck 4A together with the load 1.

Since the slide plate 63 is provided with the wheels 65, it can smoothly move on the rear deck 4. At this time, the load 1 is in close contact with the slide plate 63 and therefore it does not shift.

The stroke of the pusher 51 exceeds 2.2 m. The leading edge of the slide plate 63 can be accurately positioned at the wall surface 4B at the back of the rear deck by stopping the pushing operation of the pusher 51 when the limit switch 71 located at the leading edge of the slide plate 63 detects the wall surface 4B at the back of the rear deck 4A.

Alternatively, the stroke of the pusher 51 may be set to (2.2 m+α) allowing the pusher to extend to the full stroke thereof. This also allows the leading edge of the slide plate 63 to be accurately positioned at the wall surface 4B at the back of the rear deck. The method based on the limit switch 71 is adopted to enable the load 1 to be accurately moved to the back of the rear deck even if the length of the rear deck was not measured accurately.

Also while the load 1 is being stowed, the position of the base plate 62 with respect to the rear deck 4A is corrected. When the load 1 is stowed, the rear deck 4A lowers due to the weight of the load; if the limit switches detect such lowering, then the loading work is interrupted and the position of the base plate 62 described in (2) above is corrected. As an alternative, the position of the base plate 62 may be made to always follow the level of the rear deck 4A without interrupting the loading work. In this example, the loading work is interrupted because the rear deck 4A suddenly lowers; and if the base plate 62 fails to follow the sudden lowering of the rear deck in time, then the base plate 62 and the slide plate 63 bend, possibly preventing the slide plate 63 from being smoothly pulled back.

Figure 16A:
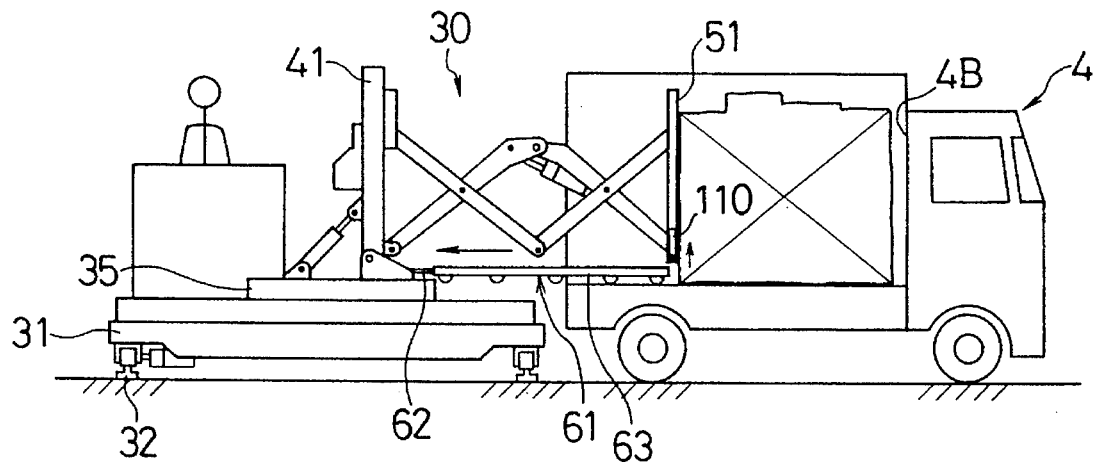
FIGS. 16A to 16C are schematic diagrams illustrative of steps (4) through (6) of another loading procedure in accordance with the present invention.

(4) The engagement formed between the pusher 51 and the slide plate 63 by the coupling device 110 is released and the slide plate 63 is pulled back, then the load 1 is set down (FIG. 16A). To be specific, the coupling pin 112 is drawn out from the engaging hole 113A by the cylinder 111.

While keeping the pusher 51 in the same position, the slide plate 63 is pulled back to set the load 1 down on the rear deck 4A.

The load 1 is set down without being pushed on the rear deck 4A. It does not fall forward from the frictional force generated between the load 1 and the rear deck 4A. Further, the load 1 is stacked near the leading edge of the slide plate 63 and hence, the load 1 is very close to the wall surface 4B at the back of the rear deck 4A. Accordingly, even if the load 1 is about to tumble due to the step formed between the slide plate 63 and the rear deck 4A, it will lean against the wall 4B which supports it and prevents tumbling.

The load 1 is moved on to the rear deck 4A, beginning with the front edge, and the rear deck 4A gradually lowers. When the base plate 62 reaches a point higher than the top surface of the rear deck 4A, however, the base plate 62 and the slide plate 63 provided on the rear deck 4A both bend, preventing the slide plate 63 from being smoothly pulled back through the base plate 62. To avoid this problem, the correction of the position of the base plate 62 described in (2) above is carried out in this case also in order to ensure that the base plate 62 closely follows the top surface of the rear deck 4A.

Figure 16B:
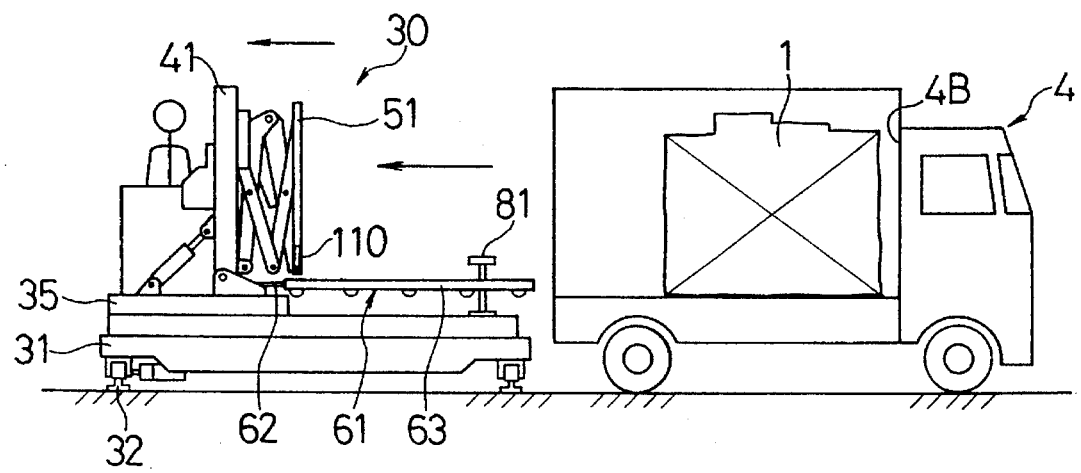

(5) The pusher 51 and the loader 35 are moved back (FIG. 16B).

The pusher 51 is contracted and the loader 35 is moved back to the home position thereof. If another load 1 is to be stowed, then the operator moves to the load receiving end with respect to the load transferring apparatus 20 to receive the next load 1.

Figure 16C:
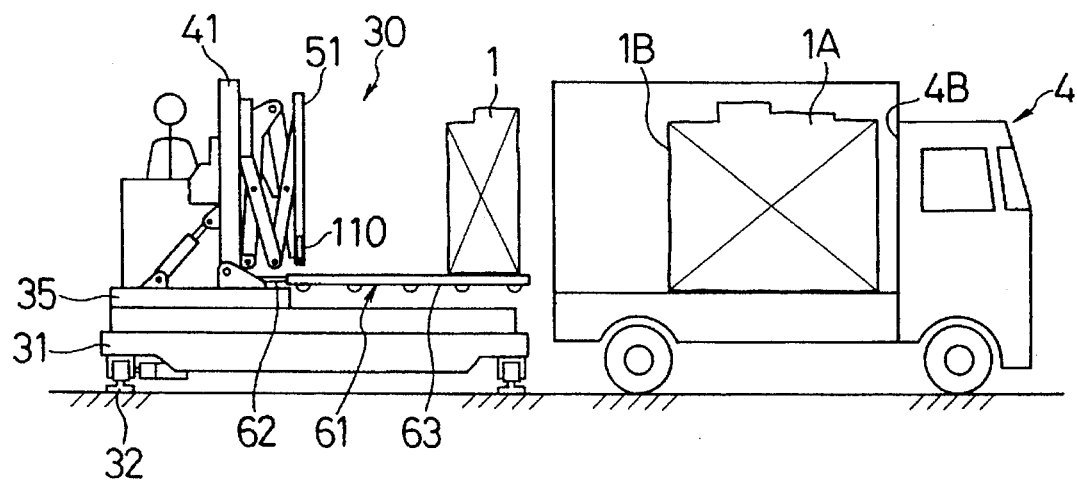

(6) The next load 1 (small package) is received and carried to the truck 4 (FIG. 16C).

When stowing another load 1 (on the standard or long truck 4), the load 1 is stacked near the leading edge of the slide plate 63 as in the case of the preceding load.

Figure 17A:
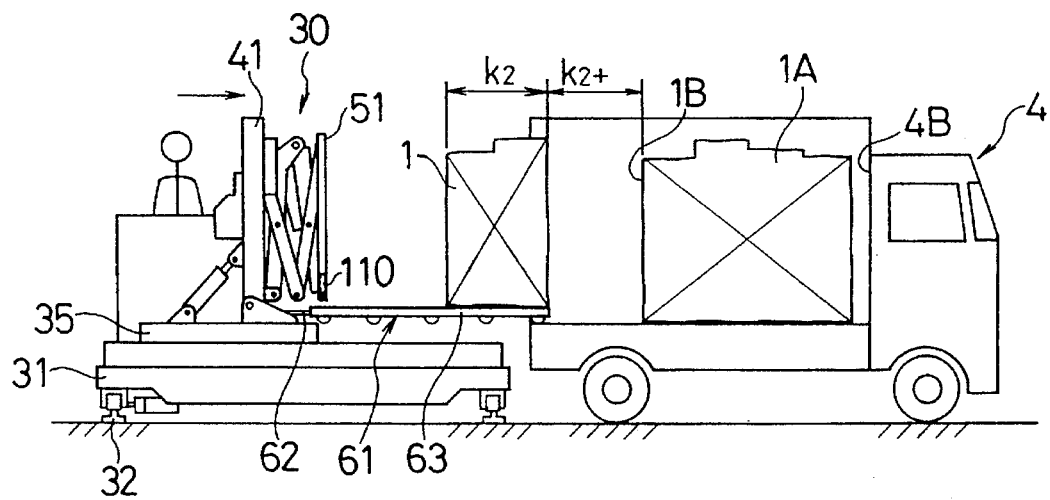
FIGS. 17A to 17C are schematic diagrams illustrative of steps (7) through (9) of another loading procedure in accordance with the present invention.

(7) The loader 35 is moved (FIG. 17A).

The position in which the loading carriage 61 is to be set on the rear deck is determined from length L of the rear deck, which has been measured in step (1) above, and length $K_1$ of the stowed load, then the loader 35 is moved toward the rear deck 4A.

Length $k_2$ of the load is 1.1 m; therefore, $$\text{Movement} = L - k_1 - (k_2 + \alpha) + a \quad (2)$$

Moving the loader 35 by the distance given by the above formula makes it possible to move the loader 61 on to the rear deck with only a gap, $k_2 + \alpha$, which is equivalent to the length of the load, left between the already stowed load 1A and the leading edge of the slide plate 63.

Figure 17B:
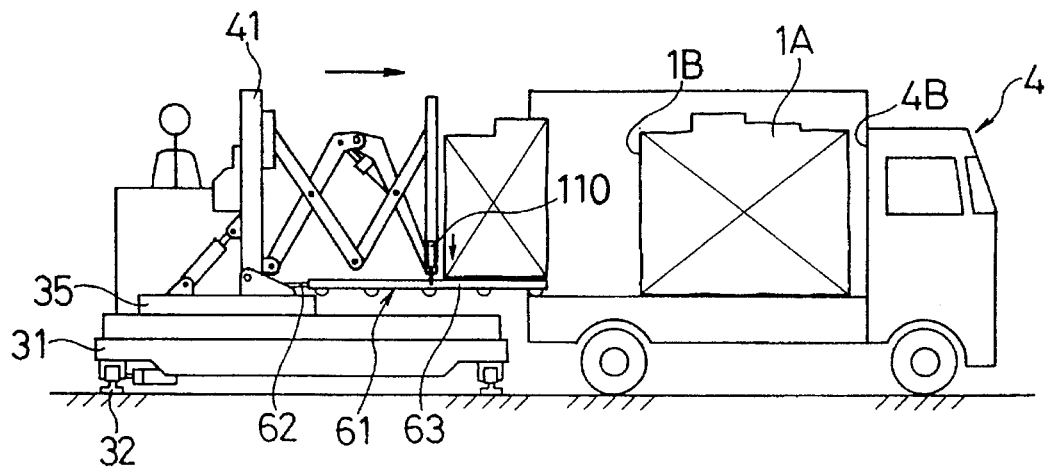

(8) The pusher 51 and the slide plate 63 are connected by the coupling device 110 (FIG. 17B).

The pusher 51 is advanced and when the detector 115 provided at the bottom of the pusher plate 54 detects the engaging hole display 116 on the slide plate 63, the pusher 51 is stopped. The cylinder 111 is actuated to engage the coupling pin 112 in the engaging hole 113B.

Figure 17C:
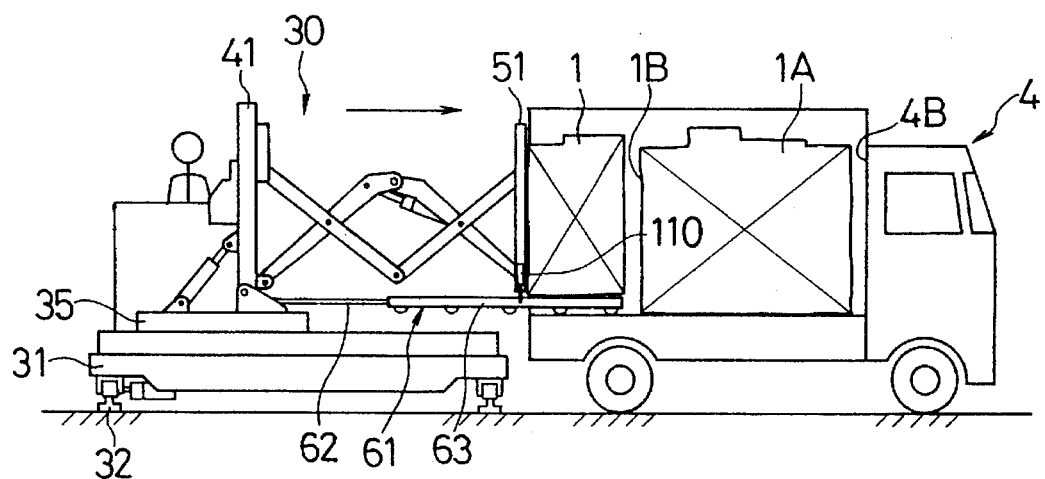

(9) The slide plate 63 is pushed in by the pusher 51 (FIG. 17C).

The base plate 62 is pushed by the pusher 51 via the coupling device 110, so that the load 1 and the slide plate 63 are moved onto the rear deck 4A.

As described in step (3), the pusher 51 stops pushing when the limit switch 71 located at the leading edge of the slide plate 63 detects the load 1.

Also as in the alternative described previously, the full stroke of the pusher 51 may be set to (2.2 m+α) and the pusher 51 may be pushed to the full stroke.

Figure 18A:
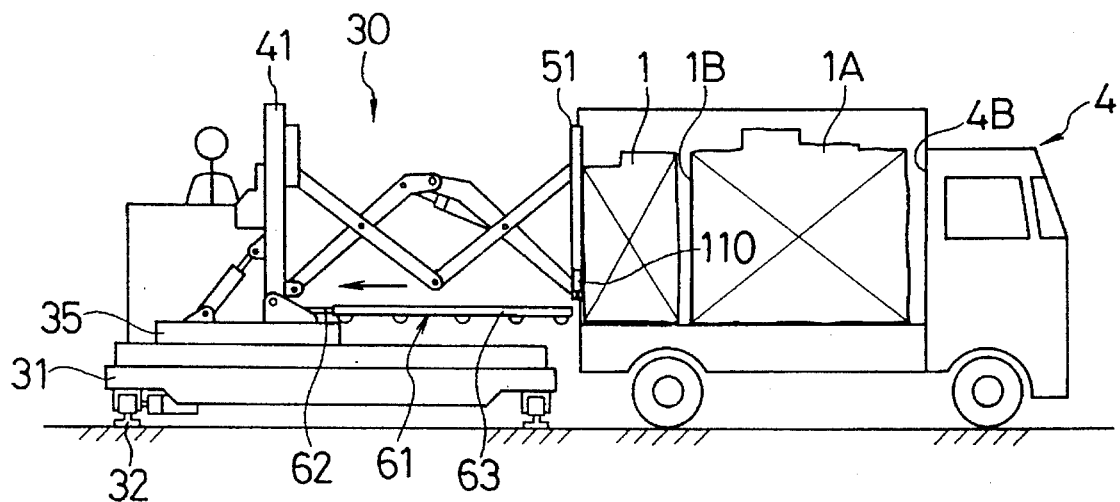
FIGS. 18A and 18B are schematic diagrams illustrative of steps (10) and (11) of another loading procedure in accordance with the present invention.

(10) The engagement formed between the pusher 51 and the slide plate 63 by the coupling device 110 is released and the slide plate 63 is pulled back, then the load 1 is set down (FIG. 18A). To be specific, the coupling pin 112 is drawn out from the engaging hole 113B by the cylinder 111.

With the pusher 51 kept in the same position, the slide plate 63 is pulled back and the load 1 is set down on the rear deck 4A.

Figure 18B:
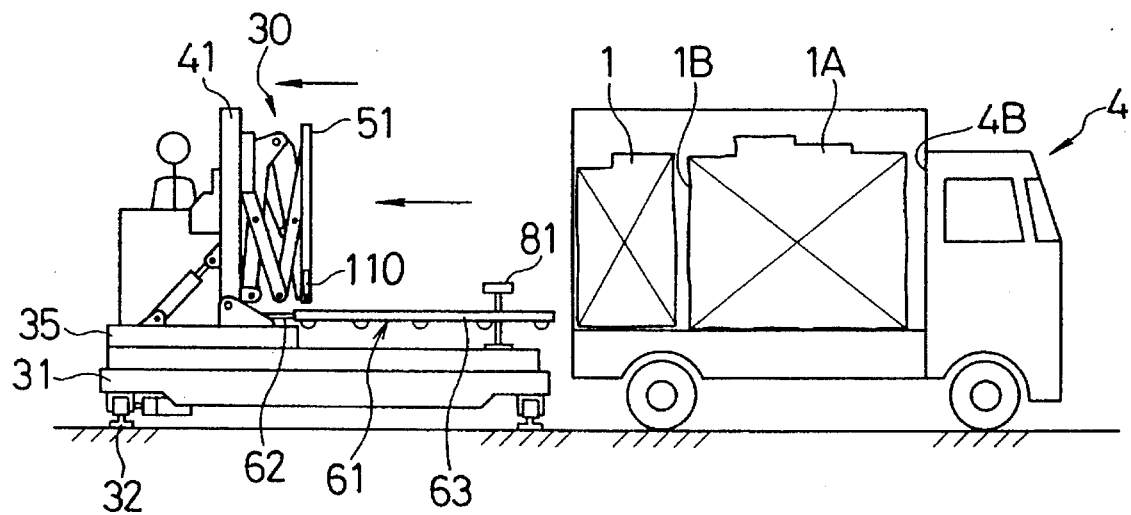

(11) The pusher 51 and the loader 35 are moved back (FIG. 18B).

The pusher 51 and the loader 53 are moved back to get ready for serving the next truck 4.

The operations of the present embodiment will now be described.

The load 1 and the slide plate 63 are moved by the pusher 51 to a loading position close to and facing against the front wall (the wall surface 4B of the rear deck 4A or the wall surface 1B of the preceding load 1 which has already been stowed) on the rear deck 4A. The load 1 is then stowed by pulling out only the slide plate 63 out with the pusher 51 kept in the same position. Hence, even if the load 1 tumbles when the slide plate 63 is drawn out, the load 1 will be supported by the front wall on the rear deck 4A, thus preventing the load from collapsing.

The load 1 and the slide plate 63 are moved to the position near and facing against the front wall on the rear deck 4A when they are pushed in by the pusher 51. This allows the load 1 to be appropriately positioned near the front wall at the back of the rear deck 4A in a stable manner. The arrangement also protects the load 1 from being pushed in excessively and crushed. It also prevents the load 1 from being insufficiently pushed in, leaving an insufficient loading space on the rear deck 4A for the next load 1.

When stowing a load by the pusher 51, the pusher 51 is coupled to the slide plate 63 to securely push the slide plate 63 in to prevent a load 1 from being pushed out with the slide plate 63 stationary, resulting in the collapse of the load 1 or the like even when the load 1 is light in weight. This means that the pusher 51 is capable of positioning the load on the slide plate 63 in the loading position in a secure and stable manner by securely pushing the slide plate 63 in.

The load 1 to be placed on the slide plate 63 is moved to the rear deck side 4A of the slide plate 63 beforehand and the pusher 51 is coupled to the slide plate 63, and then the slide plate 63 is pushed in. In this way, the slide plate 63 is pushed in by the pusher 51 to set the load in the loading position close to and facing against the front wall on the rear deck 4A. At this time, the load 1 is set in the aforesaid loading position together with the slide plate 63 rather than being slid onto the rear deck 4A from the middle point of the slide plate 63. Hence, falling or collapse of the load 1, which may occur if the load 1 is to slide on the slide plate 63, can be avoided in the stage before the load 1 is settled in the loading position.

Furthermore, the load 1 can be accurately moved to the loading position at the back of the rear deck by moving the load 1 to the leading edge of the slide plate 63 and stacking it there, moving the slide plate 63 to an initial position (away from the back of the rear deck 4A by the length of the load), and simply giving the slide plate 63 a certain amount of push by the pusher 51. This prevents the load 1 from being crushed from too much push or being insufficiently pushed in, leaving an insufficient loading space for the next load.

The load carriage 61 of the loading apparatus 30 has the base plate 62 and the slide plate 63. The slide plate 63 is connectable to the pusher 51. Accordingly, after the pusher 51 is coupled to the slide plate 63, the load 1 and the slide plate 63 are pushed in until they reach the loading position near and facing against the front wall on the rear deck 4A by the pusher 51. Only the slide plate 63 can be pulled back with the pusher kept in the same position by disconnecting the pusher 51 from the slide plate 63. Thus, the loading apparatus can be used to implement the procedures described above.

While the preferred embodiments of the invention have been described in detail with reference to the drawings, they are by no means limitative, and various changes and modifications are possible without departing from the scope and spirit of the invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

What is claimed is:

1. A method for stowing a load in a load stacking position on a rear deck having a front wall, the method comprising the steps of:

stacking said load on a slide plate having a leading edge side nearer said front wall, said load positioned on said leading edge side of said slide plate;

moving said slide plate over said rear deck whereby said leading edge of said slide plate is positioned away from said front wall by the length of said load, thereby establishing a push-in position; then linking said pusher to said slide plate after said pusher reaches a position which contacts the load in order to push said slide plate with said pusher along said deck until said load on said slide plate reach said load stacking position, said stacking position defined as a position on said deck wherein said slide plate leading edge is closed to and facing said front wall of said rear deck; and pushing said slide plate along said deck until said load on said slide plate reaches said load stacking position by said pusher; then releasing the link between said pusher and said slide plate, and then transferring said load to said load stacking position by pulling said slide plate away from said front wall and said load stacking position while said pusher is kept in said load stacking position.

2. An apparatus for stowing a load in a load stacking position on a rear deck having a front wall, said apparatus comprising:

a loader which moves towards and away from the load stacking position on said rear deck, said load stacking position defined as a position on said deck wherein said load is close to and facing said front wall;

an extendable carriage provided on said loader and on which the load is mounted, said load carriage comprised of a base plate fixed to said loader and a slide plate superimposed on said base plate and movable towards and away from said base plate, said slide plate having a leading edge side nearer said front wall, said leading edge side for receiving said load, said slide plate movable over said rear deck;

an extendable pusher provided on said loader and movable toward and away from said load stacking position, said pusher releasably linked to said slide plate when said pusher reaches a position which contacts the load, said pusher for pushing the load on said load carriage to said load stacking position;

wherein said pusher is capable of simultaneously pushing said load and said slide plate along said deck until said load on said slide plate reaches said load stacking position.

3. A method for stowing a load in a load stacking position on a rear deck having a front wall, the method comprising the steps of:

stacking said load on a slide plate having a leading edge side nearer said front wall, said load positioned on said leading edge side of said side plate;

moving said slide plate over said rear deck whereby said leading edge of said slide plate is positioned away from said front wall by a length of said load, thereby establishing a push-in position; then linking a pusher to said slide plate in order to push said slide plate with said pusher along said deck until said load on said slide plate reaches the load stacking position, said stacking position defined as a position on said deck wherein said slide plate leading edge is close to and facing said from wall of said rear deck;

pushing said slide plate along said deck with said pusher until said load on said slide plate reaches said load stacking position; then releasing the link between said pusher and said slide plate, and then transferring said load to said load stacking position by pulling said slide plate away from said from wall and said load stacking position while said pusher is kept in said load stacking position.

* * * * *